United States Patent
Ando et al.

(10) Patent No.: US 8,122,025 B2
(45) Date of Patent: Feb. 21, 2012

(54) METHOD OF MANAGING LOCATIONS OF INFORMATION AND INFORMATION LOCATION MANAGEMENT DEVICE

(75) Inventors: Takahisa Ando, Kawasaki (JP); Satoko Shiga, Kawasaki (JP); Akira Sato, Kawasaki (JP); Tatsuya Asai, Kawasaki (JP); Seishi Okamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 423 days.

(21) Appl. No.: 12/409,612

(22) Filed: Mar. 24, 2009

(65) Prior Publication Data

US 2009/0240669 A1   Sep. 24, 2009

(30) Foreign Application Priority Data

Mar. 24, 2008 (JP) ................................. 2008-076670

(51) Int. Cl.
*G06F 7/00* (2006.01)
(52) U.S. Cl. ........ 707/736; 707/628; 707/758; 709/206; 715/752
(58) Field of Classification Search ........... 707/999.006, 707/628, 638, 999.003, 736, 758; 709/206, 709/223, 245; 715/752
See application file for complete search history.

(56) References Cited

U.S. PATENT DOCUMENTS 6,952,805 B1 * 10/2005 Tafoya et al. ................. 715/739
7,904,459 B2 * 3/2011 Grigsby et al. ............... 707/740
2003/0200334 A1 * 10/2003 Grynberg ...................... 709/245
2005/0149507 A1 * 7/2005 Nye .................................. 707/3
2007/0094365 A1 * 4/2007 Nussey et al. ................. 709/223
2007/0288575 A1 * 12/2007 Gillum et al. ................. 709/206

FOREIGN PATENT DOCUMENTS

| JP | 2002-049541 A | 2/2002 |
| JP | 2002-190904 A | 7/2002 |
| JP | 2002-197027 A | 7/2002 |
| JP | 2007-053569 A | 3/2007 |

* cited by examiner

*Primary Examiner* — Dennis Truong
(74) *Attorney, Agent, or Firm* — Fujitsu Patent Center

(57) ABSTRACT

A communication log storage section stores a communication log of emails exchanged with an external device over an external network. An acquisition destination-selecting section reads out the communication log and identifies an other-end party with whom a target user has performed transmission and reception of emails not less than a predetermined number of times to select the other-end party as an information acquisition destination. An information location-generating section extracts key information related to a location of information at the information acquisition destination contained in the emails transmitted and received to and from the information acquisition destination, to generate information location information. The information location information is stored in an information location-accumulating section. An information acquisition device acquires the information based on the information location information accumulated in the information location-accumulating section.

12 Claims, 20 Drawing Sheets

1110 COMMUNICATION LOG

| ID | SENDER | DESTINATION | SUBJECT | DATE |
|---|---|---|---|---|
| 1 | A1@a.co.jp | B1@b.co.jp | S1 | 2007/11/28:12:00:00 |
| 2 | B1@b.co.jp | A1@a.co.jp | S1 | 2007/11/28:11:00:00 |
| 3 | A1@a.co.jp | B1@b.co.jp | S2 | 2007/11/27:22:00:01 |
| 4 | B1@b.co.jp | A1@a.co.jp | S3 | 2007/11/27:20:00:30 |
| 5 | A1@a.co.jp | B1@b.co.jp | S3 | 2007/11/26:19:50:15 |
| 6 | B1@b.co.jp | A2@a.co.jp | S4 | 2007/11/26:15:30:00 |
| 7 | A2@a.co.jp | B1@b.co.jp | S4 | 2007/11/25:10:00:30 |
| 8 | A1@a.co.jp | B1@b.co.jp | S5 | 2007/11/24:18:20:00 |
| 9 | B2@b.co.jp | A2@a.co.jp | S6 | 2007/11/23:23:40:00 |
| 10 | A2@a.co.jp | B2@b.co.jp | S6 | 2007/11/23:22:50:45 |
| 11 | A2@a.co.jp | B3@b.co.jp | S7 | 2007/11/22:13:40:00 |
| 12 | B3@b.co.jp | A2@a.co.jp | S7 | 2007/11/22:11:40:00 |
| 13 | B1@b.co.jp | A1@a.co.jp | S5 | 2007/10/10:10:00:00 |
| 14 | A3@a.co.jp | B1@b.co.jp | S8 | 2007/10/08:01:20:00 |
| ⋮ | ⋮ | ⋮ | ⋮ | ⋮ |

1120 CANDIDATE LIST

| ID | USER | DESTINATION |
|---|---|---|
| 1 | B1@b.co.jp | A2@a.co.jp |
| 2 | B2@b.co.jp | A2@a.co.jp |
| 3 | B3@b.co.jp | A2@a.co.jp |
|  |  |  |

1130 URL ACCUMULATED INFORMATION

| ID | USER | DESTINATION | COLLECTING DESTINATION URL |
|---|---|---|---|
| 1 | B1@b.co.jp | A1@a.co.jp | http://a.co.jp |
| 2 | B2@b.co.jp | A1@a.co.jp | http://a.co.jp |
| 3 | B1@b.co.jp | A2@a.co.jp | http://a.co.jp |
| 4 | B1@b.co.jp | A1@a.co.jp | http://yyy.com |
| 5 | B2@b.co.jp | C1@xxx.co.jp | http://xxx.co.jp |
| 6 | B3@b.co.jp | C2@c.co.jp | http://c.co.jp |
| 7 | B1@b.co.jp | D1@d.co.jp | http://d.com |
| ⋮ |  |  |  |

SELECTION RULE 1

"EMAILS HAVE BEEN DIRECTLY EXCHANGED MORE THAN ONCE WITHIN A WEEK"

1120a  CANDIDATE LIST (SELECTION RULE 1)

| ID | USER | DESTINATION |
|---|---|---|
| 1 | B1@b.co.jp | A1@a.co.jp |

FIG. 8A

SELECTION RULE 2

"EMAILS HAVE BEEN EXCHANGED DIRECTLY WITHIN A WEEK, AND HAVE BEEN EXCHANGED WITH OTHER MEMBERS MORE THAN ONCE"

1120b  CANDIDATE LIST (SELECTION RULE 2)

| ID | USER | DESTINATION |
|---|---|---|
| 1 | B1@b.co.jp | A2@a.co.jp |
| 2 | B2@b.co.jp | A2@a.co.jp |
| 3 | B3@b.co.jp | A2@a.co.jp |

FIG. 8B

310 USER B1 LIST

| TITLE OF RESPECTIVE SITE | URL | SAVING DESTINATION FOLDER |
|---|---|---|
| A Co. Inc. | http://a.co.jp | — |
| PRESS RELEASE OF COMPANY A | http://a.co.jp/press/ | PRESS RELEASE |
| TEAM C | http://c.org | — |
|  |  |  |

320 USER B2 LIST

| TITLE OF RESPECTIVE SITE | URL | SAVING DESTINATION FOLDER |
|---|---|---|
| C Co. Inc. | http://c.co.jp | — |
| E Co. Inc. | http://e.co.jp | EInc |
| F PRESS COMPANY | http://ccc.com | PRESS |
| A Co. Inc. | http://a.co.jp | — |
|  |  |  |

Hello, Ms. X.

This is A1 of XX center of A Co. Inc.

...

----------------------------------------
A Co. Inc. XX center    URL:http://xx.a.co.jp/  ⟵ 411
A1  e-mail:  A1@a.co.jp

420

Hello, Ms. X.

Thank you for the cooperation.
This is A1 of XX center of A Co. Inc.

...

----------------------------------------
A Co. Inc. XX center    URL:http://xx.a.co.jp/  ⟵ 421
A1  e-mail:  A1@a.co.jp

FIG. 17

[1] CANDIDATE LIST OBTAINED

1120c CANDIDATE LIST

| ID | USER | DESTINATION |
|---|---|---|
| 1 | B1@b.co.jp | A5@a.co.jp |

[2] URL ACCUMULATED INFORMATION OBTAINED   1130a URL ACCUMULATED INFORMATION

| ID | USER | DESTINATION | COLLECTING DESTINATION URLS |
|---|---|---|---|
| 1 | B2@b.co.jp | A5@a.co.jp | http://a.co.jp |
| 2 | B3@b.co.jp | A5@a.co.jp | http://a/a.co.jp |
| 3 | B4@b.co.jp | A5@a.co.jp | http://aaa.a.co.jp |
| 4 | B5@b.co.jp | A5@a.co.jp | http://a.co.jp |

[3] URL ACCUMULATED INFORMATION REGISTRATION   1130b URL ACCUMULATED INFORMATION

| ID | USER | DESTINATION | COLLECTING DESTINATION URLS |
|---|---|---|---|
| 1 | B2@b.co.jp | A5@a.co.jp | http://a.co.jp |
| 2 | B3@b.co.jp | A5@a.co.jp | http://a/a.co.jp |
| 3 | B4@b.co.jp | A5@a.co.jp | http://aaa.a.co.jp |
| 4 | B5@b.co.jp | A5@a.co.jp | http://a.co.jp |
| 5 | B1@b.co.jp | A5@a.co.jp | http://a.co.jp |
| 6 | B1@b.co.jp | A5@a.co.jp | http://a/a.co.jp |
| 7 | B1@b.co.jp | A5@a.co.jp | http://aaa.a.co.jp |

FIG. 19

METHOD OF MANAGING LOCATIONS OF INFORMATION AND INFORMATION LOCATION MANAGEMENT DEVICE

CROSS-REFERENCE TO RELATED APPLICATIONS

This application is based upon and claims the benefits of priority from the prior Japanese Patent Application No. 2008-076670, filed on Mar. 24, 2008, the entire contents of which are incorporated herein by reference.

BACKGROUND OF THE INVENTION

1. Field of the Invention

This invention relates to a method of managing locations of information and an information location management device, and more particularly to a method of managing locations of information and an information location management device, for controlling locations of predetermined pieces of information existing on the network.

2. Description of the Related Art

In recent years, with the development of computers and the network system, it has become possible to collect desired pieces of information existing on the network. For example, a WWW (World Wide Web) as a document system on the internet has got into widespread use to form a worldwide huge WWW network. However, it is not easy to extract necessary information from such enormous amounts of information. As a solution, an RSS (Rich Site Summary) reader which is designed to collect information from websites (Web sites) is now starting to be widely used. The RSS reader has the function of crawling websites to automatically collect updated information written in RSS on the websites, and displaying the collected information. The user can collect up-to-date information on the websites without crawling the websites by himself. The RSS reader makes it possible to dramatically improve the efficiency of collecting information provided by the websites.

Further, as a method of managing locations of information, bookmarking provided by browsers is known. The user can register locations of desired websites in bookmarks. The following description is given assuming that the location of an information resource is indicated using a URL (Uniform Resource Locator) which is a most popular indication method. Bookmarking makes it possible to immediately access necessary websites.

However, information necessary for users changes with time. In view of this, an address management method has been proposed in which the respective counts of access to websites are monitored, and when the access count of a website exceeds a predetermined reference value for website addition, the URL of the website is added to a list of bookmarks, whereas when the same does not exceed the predetermined reference value, the URL of the website is deleted from the list (e.g. see Japanese Unexamined Patent Publication No. 2002-49541 (FIG. 9)). Further, as a method of managing email addresses, there has been known a technique in which the frequency of use of each email address for email transmission and reception over a predetermined time period is determined, and the email addresses are managed according to the frequency of use of each address (e.g. see Japanese Unexamined Patent Publication No. 2002-197027 (FIG. 2)).

However, the conventional method of managing locations of information suffers from the problem that the management of locations where desired information is stored becomes a great burden.

Although the RSS reader is very effective in collecting information from designated websites, the user has to register websites to be crawled in advance, and hence there is a problem that it is necessary for users to do some extra work. Although a method of registering websites which are accessed at a high frequency in the list of bookmarks is disclosed, the user has to find new websites from which information is to be obtained, as a preliminary step by himself. The user is required to find out such new websites from which information is to be obtained e.g. by a search using a search engine, or by searching for links to necessary information from the information currently registered in the list.

Further, if information becomes unnecessary, websites registered therefor have to be deleted from the list. Although a method of deleting websites which are accessed at a low frequency from the list of bookmarks is disclosed, it is difficult to apply the method directly to the RSS reader which crawls the registered websites to automatically collect information therefrom.

Information which a user desires to collect changes as the time elapses. Particularly, information necessary for business incessantly changes, and hence it is very difficult to continuously do maintenance on the list. For this reason, maintenance has not been done on the list, which often makes the list less associated with the situation of the user, e.g. due to the fact that the information from websites to be crawled which are registered on the list has become unnecessary, or locations of necessary information have not been registered. As a result, the user cannot obtain useful information.

SUMMARY OF THE INVENTION

The present invention has been made in view of the above-described problems, and an object thereof is to provide a method of managing locations of information and an information location management device which are capable of updating information location information corresponding to locations of information which a user desired to acquire, as required.

To attain the above object, there is provided a method of managing information locations of predetermined information existing on a network. The method comprises a procedure in which an acquisition destination-selecting section reads out, from a communication log storage section storing a communication log concerning emails transmitted and received, the communication log within a predetermined time period, and identifies an other-end party with whom a target user has performed transmission and reception of at least one reciprocated pair of emails not less than a predetermined number of times to select the other-end party as an information acquisition destination, and a procedure in which an information location-generating section extracts key information related to a location of information at the information acquisition destination contained in the emails transmitted and received to and from the information acquisition destination, and based on the key information, generates information location information indicating the location of the information at the information acquisition destination to store the information location information in an information location-accumulating section.

To attain the above other object, there is provided an information location management device that manages locations of predetermined information existing on a network. The information location management device comprises an acquisition destination-selecting section to read out, from a communication log storage section storing a communication log concerning emails transmitted and received, the communication log corresponding to a predetermined time period, identify an other-end party with whom a target user has performed transmission and reception of at least one reciprocated pair of emails not less than a predetermined number of times to select the other-end party as an information acquisition destination, and an information location-generating section designed to extract key information related to a location of information at the information acquisition destination contained in the emails transmitted and received to and from the information acquisition destination, and based on the key information, generate information location information indicating the location of the information at the information acquisition destination to store the information location information in an information location-accumulating section.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 5 is a diagram of an example of a communication log;

FIG. 6 is a diagram of an example of a candidate list;

FIG. 7 is a diagram of an example of URL accumulated information;

FIGS. 8A and 8B are diagrams of actual examples of acquisition destination selection processing;

FIGS. 10A and 10B are examples of a list after RSS reader registration processing;

FIG. 17 is a diagram of an example of URL information which is generated from bodies of emails;

FIG. 19 is a diagram of an example of URL information which is generated from registration information of other users.

DESCRIPTION OF THE PREFERRED EMBODIMENTS

The invention will now be described in detail with reference to drawings showing preferred embodiments thereof.

Figure 1:
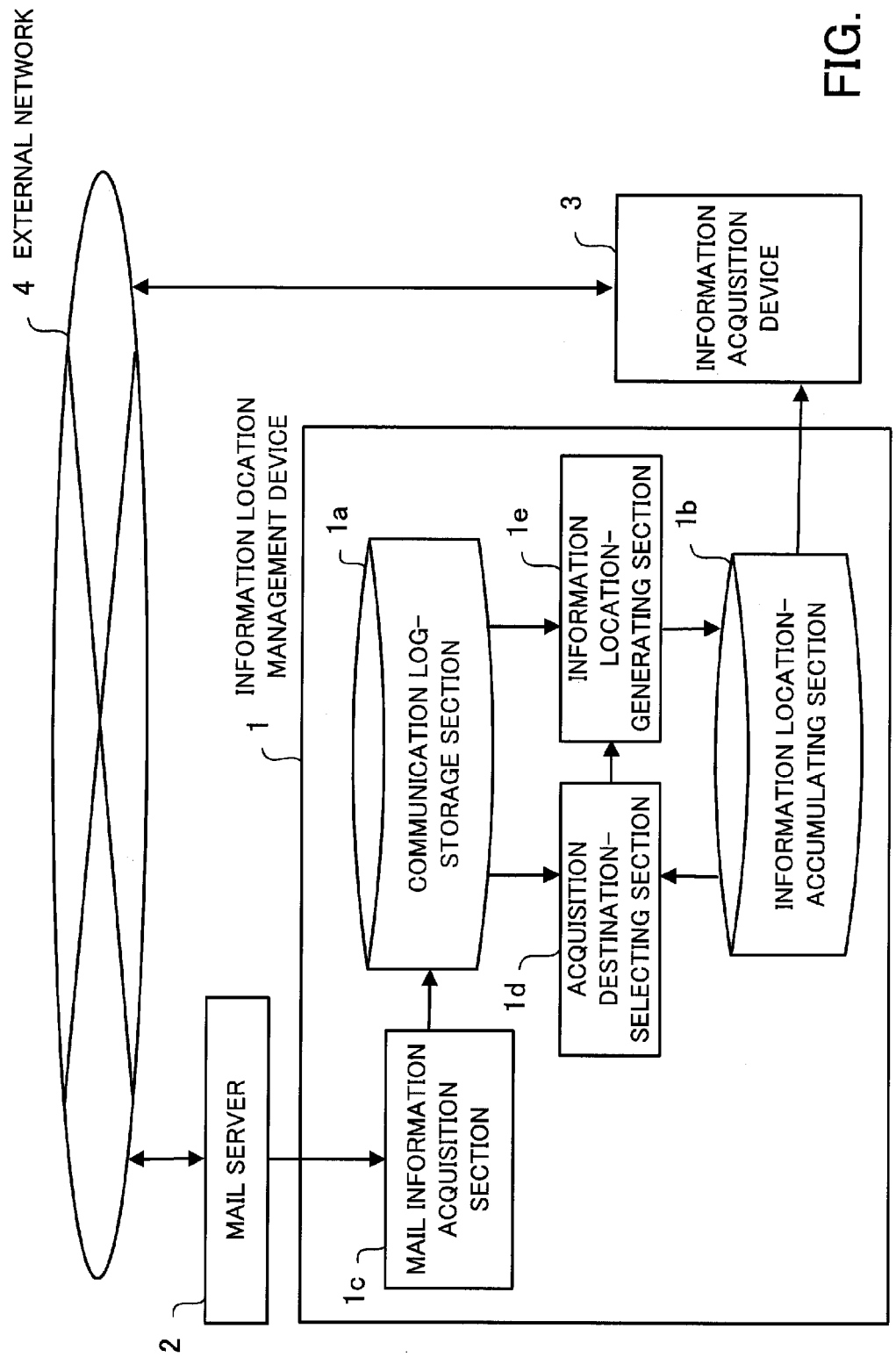
FIG. 1 is a view showing the concept of the present embodiment, which is applied to embodiments thereof.

FIG. 1 is a view of the concept which is applied to embodiments.

An information location management device 1 includes a communication log-storage section 1a, an information location-accumulating section 1b, a mail information acquisition section 1c, an acquisition destination-selecting section 1d, and an information location-generating section 1e, and is connected to a mail server 2 which is connected to an external network 4, and an information acquisition device 3. Further, the information location management device 1 manages the locations of predetermined information existing on the external network 4.

The communication log-storage section 1a stores communication records of emails which are sent and received via the mail server 2. The communication records include records of email exchange which a target user has performed with other-end parties. It should be noted that "email exchange" represents execution of transmission/reception of emails of not less than one reciprocated pair to/from an other-end party having an identical address to an extent of more than one reciprocation of emails. That is, email exchange between the user and an other-end party refers to the fact that an email is sent from the user to the other-end party and an email is received from the other-end party by the user.

The information location-accumulating section 1b is a storage section which stores information location information indicating information locations concerning information acquisition destinations which are generated by the information location-generating section 1e.

The mail information acquisition section 1c stores email information which is sent and received via the mail server 2 in the communication log-storage section 1a as a communication log. Sending and receiving all emails is performed via the mail server 2, which enables the mail information acquisition section 1c to acquire information concerning all emails sent and received. The communication log stores not only a sender of each email, a recipient as a destination, a subject, a receipt time, but also a body of the email, if necessary.

The acquisition destination-selecting section 1d reads out a new communication log from the communication log-storage section 1a, identifies an other-end party with whom the target user has performed email exchange within a predetermined time period, that is, the other-end party with whom the user performed transmission/reception of emails not less than one reciprocated pair of emails, not less than a predetermined number of times, and selects the person as an information acquisition destination. The predetermined time period is set to a time period during which the situation of the user does not change, for example, a week or 10 days or so. The time period is determined according to the situation of the user, on an as-needed basis. Further, when there is a big change in business, the time period may be set each time. The at least one reciprocated pair of emails is set, for the purpose of eliminating advertisement mails or spam mails, and selecting an other-end party with whom the user exchanges some kind of information as an information acquisition destination. Further, as the predetermined number, there is registered in advance one or not less than 1 arbitrary integer number. This is because if the other-end party is important, emails are expected to be exchanged a plurality of times. Thus, information acquisition destinations are selected. Further, assuming that the other-end party is a business-related person, there is a high possibility that the person exchanges emails with another user who belongs to the same group, such as the same section or the same company, to which the target user belongs, even if the number of times of execution of email exchange with the user is small. Therefore, the system may be configured such that even if the number of times of execution of email exchange with the target user is small, the other-end party is selected as an information acquisition destination if emails have been exchanged with the other user. Further, in a reversed case where emails have been exchanged with a person belonging to the same group to which the other-end party belongs as well, the person may be selected as a useful information acquisition destination.

The information location-generating section 1e reads out information related to emails which have been exchanged with the selected information acquisition destinations, and further bodies of the emails, if necessary, from the communication log-storage section 1a, extracts the key information related to the locations of information at the information acquisition destinations contained in information related to the read emails, and then, based on the extracted key information, generates information location information indicating the locations of information at the information acquisition destinations, and stores the information location information in the information location-accumulating section 1b. The key information includes information on an information location, such as a domain name included in an email address, and a URL included in a body of an email. In an organization, such as a company, it is often the case that a domain name which is included in each of email addresses which members of the organization use partially matches each information location indicating the location of information concerning the organization, e.g. in respect of a portion corresponding to a name of the organization. Therefore, an information location candidate is generated from the domain name, and it is determined whether or not the information location candidate exists on the external network 4. If it does, the information location candidate is set to the information location, and the information on the information location (information location information) is stored in the information location-accumulating section 1b. Further, it is presumed that the information location which often appears in emails of the same user is, in most cases, one closely related to the user, such as a website of the company to which the user belongs, which is mentioned in the user's signature in the emails. Therefore, the information location appearing in bodies of emails not less than a predetermined number of times is identified as an information location of the other-end party, and is stored in the information location-accumulating section 1b.

The mail server 2 manages emails which are sent and received via the external network 4.

The information acquisition device 3 accesses, at a predetermined period, the information locations the information on which is stored in the information location-accumulating section 1b, via the external network 4, and collects provided information.

The external network 4 is e.g. the Internet, and makes it possible to collect information provided by companies connected to the external network 4, using the information location information.

Now, a description will be given of a processing procedure performed based on a method of managing locations of information, by the information location management device 1 configured as described above.

The mail information acquisition section 1c acquires email information which is sent and received via the mail server 2, and stores the email information in the communication log-storage section 1a. The acquisition destination-selecting section 1d reads out a new communication log from the communication log-storage section 1a, and identifies an other-end party with whom the user as the target of checking performed transmission/reception of emails of at least one reciprocated pair of emails within a predetermined time period. If the number of times of execution of email exchange with the other-end party is not less than a predetermined number, the other-end party is set to an information acquisition destination. This is because information of the other-end party with whom the user frequently exchanges emails is presumed to be important for the user. Further, even if the number of times of execution of email exchange is less than a predetermined number, insofar as emails have been exchanged with other users who belongs to the same group to which the target user belongs, the other-end party can be set to an information acquisition destination. The predetermined time period, the number of times of execution of email exchange with reference to which an other-end party is to be selected as an information acquisition destination, whether or not to refer to exchange of emails with other users of the same group to which the user belongs, and so on may be defined as a rule for selection in advance.

After the information acquisition destinations are thus selected, the information location-generating section 1e reads out the information concerning emails sent and received to and from the information acquisition destinations from the communication log-storage section 1a, and extracts key information related to the location of information at each information acquisition destination, which is included in the information concerning the emails read out. Then, based on the extracted key information, the information location-generating section 1e generates information location information indicating the location of information at each information acquisition destination, and stores the same in the information location-accumulating section 1b. For example, information locations are set using email addresses and URLs in bodies of emails as key information. The information acquisition device 3 is capable of acquiring information concerning the information acquisition destination by accessing the information acquisition destination the information on which is stored in the information location-accumulating section 1b via the external network 4.

By carrying out these processes, information location information of each other-end party with whom emails have been exchanged a predetermined number of times or more within a predetermined time period is accumulated in the information location-accumulating section 1b. Since the information of the other-end party with whom emails are frequently exchanged is presumed to be important, it is possible to easily obtain useful information which the user desires to get, based on the information location information which is automatically accumulated in the information location-accumulating section 1b. The user is no longer required to set locations of information by search by himself, which makes it possible to reduce the burden on the user for managing locations of information which the user desires to acquire. The obtained information location can be used for bookmarks in the web browser, or registration of websites to be crawled by the RSS reader.

Hereafter, a detailed description will be given of embodiments in which the embodiment is applied to the management of a crawling destination list of the RSS reader with reference to drawings. In the crawling destination list, there are stored URLs of websites which the RSS reader regularly accesses to automatically collect information.

Figure 2:
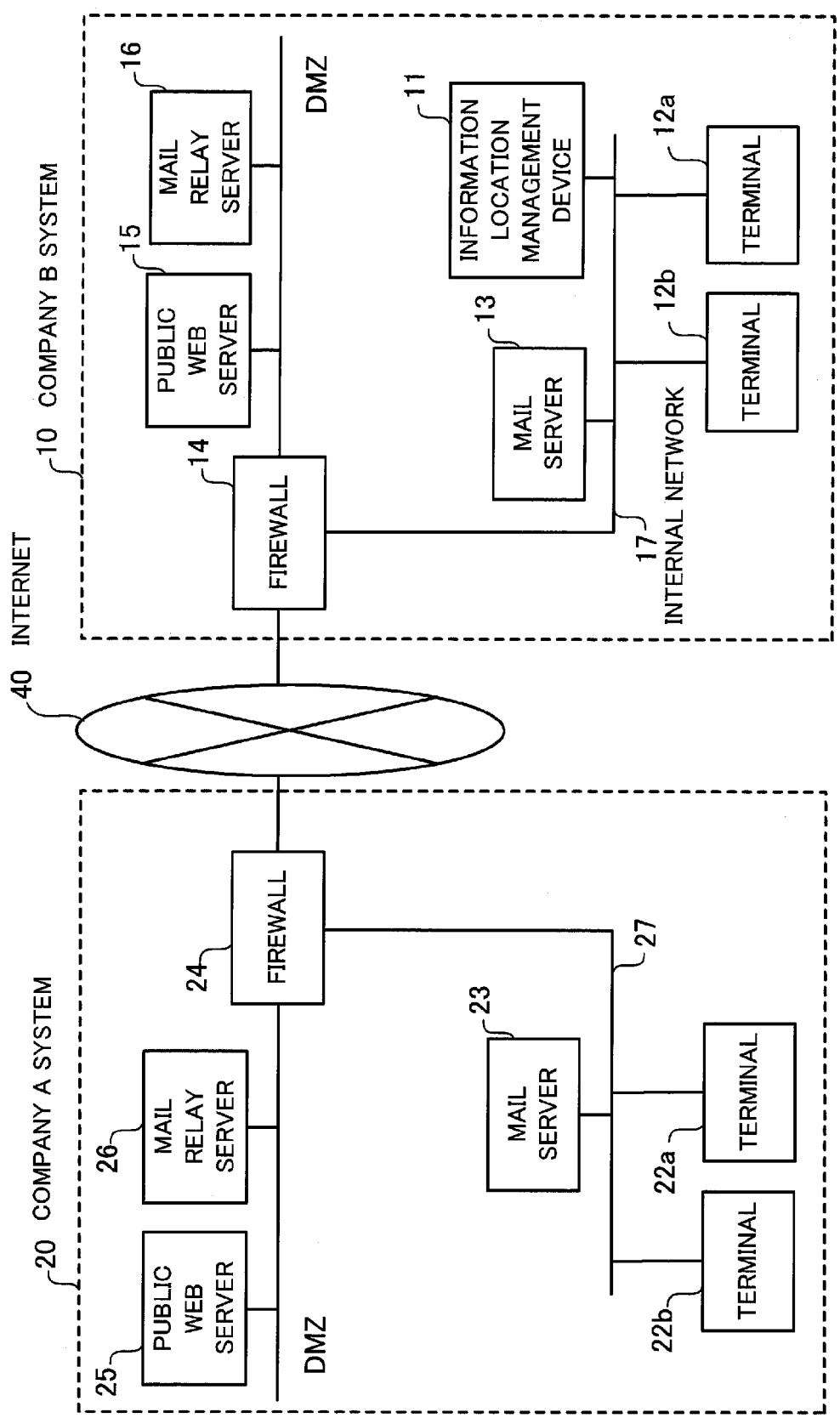
FIG. 2 is a view of an example of a construction of a system according to the embodiment.

FIG. 2 is a view of an example of a construction of a system common to the embodiments.

An information location management device 11 according to the embodiments is disposed in a Company B system 10 which is connected to the Internet 40. In the Company B system 10, the information location management device 11, user terminals 12a and 12b, and a mail server 13 which are connected to an internal network 17 are connected to a public web server 15 and a mail relay server 16 in DMZ (DeMilitarized Zone), and the Internet 40 outside the Company B system 10, via a firewall 14. Further, similarly to the Company B system 10, a Company A system 20 is configured such that terminals 22a and 22b, and a mail server 23 connected to an internal network 27 are connected to a public web server 25 and a mail relay server 26 in DMZ, and the Internet 40 outside the Company A system 20, via a firewall 24.

The mail server 13 manages a mailbox to monitor transmission and reception of emails by the terminals 12a and 12b. The terminals 12a and 12b each have a mailer for performing a mailing process, and the RSS reader, and set crawling destinations of the RSS reader based on the crawling destination list delivered from the information location management device 11. The public web server 15 manages websites that can be accessed via the Internet 40. By accessing using predetermined URLs, it is possible to obtain information provided by Company A at a website. The mail relay server 16 relays emails exchanged between the external terminals 22a and 22b which are connected via the Internet 40, and the terminals 12a and 12b which are connected to the internal network 17. It should be noted that corresponding devices in the Company A system 20 have similar functions.

The information location management device 11 monitors emails exchanged between the terminals 12a and 12b which are connected to the internal network 17 and the external terminals (e.g. the terminals 22a and 22b of Company A), and if necessary, obtains URLs of information provided by the public web server 25 of Company A based on the exchanged emails, and delivers the obtained URL information to the RSS reader of the terminals 12a and 12b. Further, when it is determined that these URLs are not necessary, they are deleted.

Although in the illustrated example, the information location management device 11 is disposed in the network, and the obtained URL information is delivered to each of the terminals 12a and 12b, it is also possible to configure the system such that the information location management device 11 is incorporated in the terminals 12a and 12b or the like. Further, URL information may be obtained from the information location management device 11 by the terminals 12a and 12b, on an as-needed basis.

Figure 3:
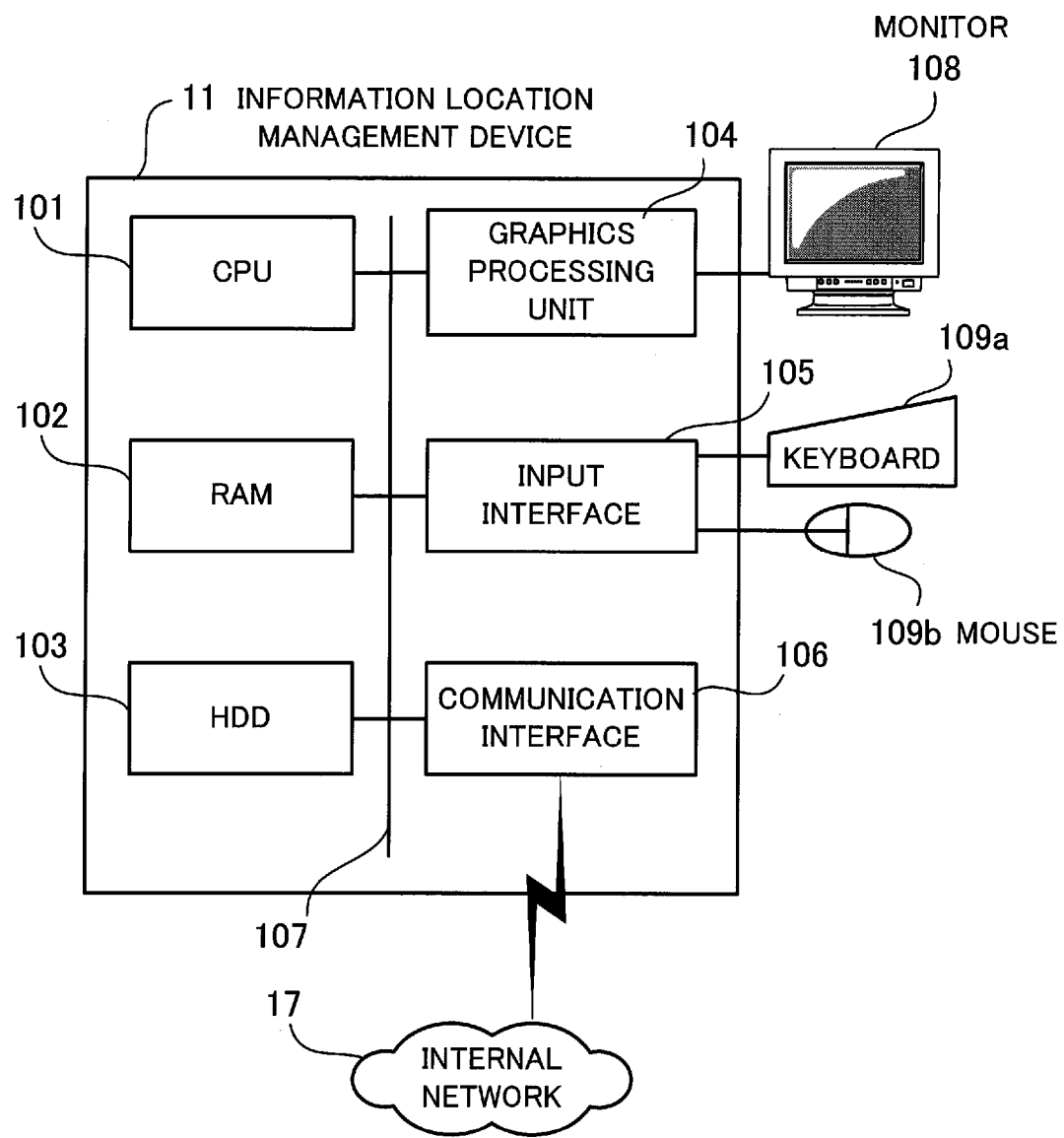
FIG. 3 is a block diagram of an example of a hardware construction of an information location management device.

Here, a description will be given of a hardware construction of the information location management device 11. FIG. 3 is a block diagram of an example of the hardware construction of the information location management device 11.

The whole information location management device 11 is controlled by a CPU (Central Processing Unit) 101 to which are connected a RAM (Random Access Memory) 102, a HDD (Hard Disk Drive) 103, a graphics processing unit 104, an input interface 105, and a communication interface 106 via a bus 107.

The RAM 102 temporarily stores at least part of a program of an OS (Operating System) and application programs which the CPU 101 is caused to execute. Further, the RAM 102 stores various data which are necessary for processing by the CPU 101. The HDD 103 stores the program of the OS and the application programs. A monitor 108 is connected to the graphics processing unit 104, and displays images on a screen thereof according to commands from the CPU 101. A keyboard 109a and a mouse 109b are connected to the input interface 105, and signals delivered from the keyboard 109a or the mouse 109b are transmitted to the CPU 101 via a bus 107. The communication interface 106 is connected to the internal network 17, and exchanges data with other devices via the internal network 17.

With the hardware construction described above, it is possible to realize processing functions according to the embodiments. Although the hardware construction of the information location management device 11 is shown in FIG. 3, other devices of the system shown in FIG. 2, such as the terminals 12a and 12b, also have a similar hardware construction.

Next, a description will be given of an example of a software construction which realizes processing functions of the information location management device 11. First, a description will be given of an overall processing function of the information location management device 11 according to a first embodiment as one of the above-mentioned embodiments, and a URL generation process for generating URLs based on email addresses.

Figure 4:
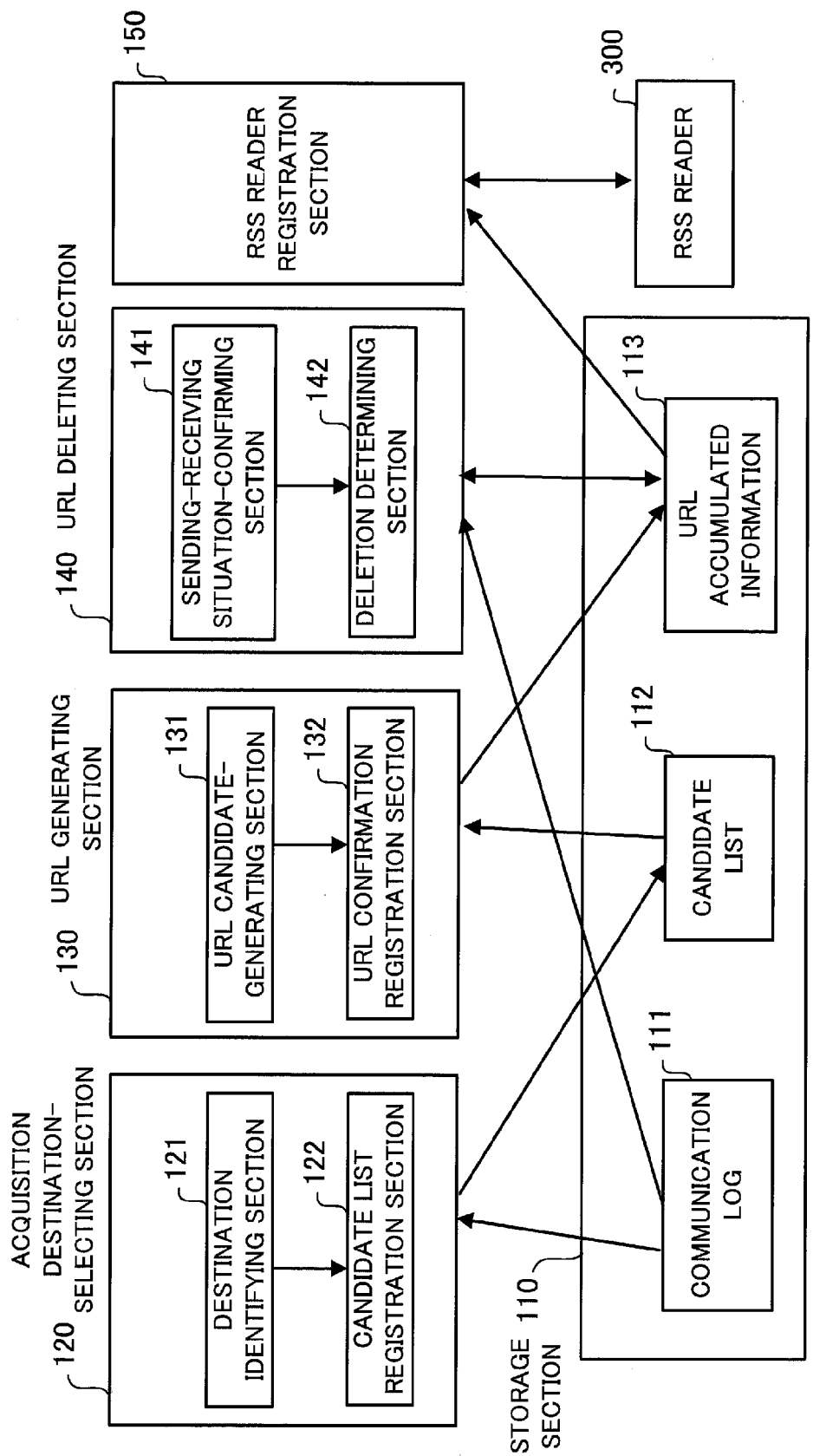
FIG. 4 is a functional block diagram of essential parts of the information location management device according to a first embodiment.

FIG. 4 is a functional block diagram of essential parts of the information location management device according to the first embodiment.

The essential parts of the information location management device 11 according to the first embodiment include a storage section 110, an acquisition destination-selecting section 120, an URL generating section 130, an URL deleting section 140, and an RSS reader registration section 150, and manages a crawling destination list for registering URLs of information locations round which an RSS reader 300 crawls.

The storage section 110 stores a communication log 111 in which transmission and reception of emails are recorded, a candidate list 112 of information acquisition destinations which are selected by the acquisition destination-selecting section 120, URL accumulated information 113 accumulating the URLs generated by the URL generating section 130, and so forth. Detailed description of each kind of information will be given hereinafter.

The acquisition destination-selecting section 120 has a destination identifying section 121, and a candidate list registration section 122, and functions as the acquisition destination-selecting section 1d. The destination identifying section 121 identifies an other-end party with whom the target user (hereinafter referred to as the user) performed transmission/reception of at least one reciprocated pair of emails within a predetermined time period. The candidate list registration section 122 determines whether or not the other-end party identified by the destination identifying section 121 can be a candidate of the information acquisition destination. For example, if the number of times of execution of email exchange is not less than a predetermined number, the other-end party with whom emails have been exchanged is selected as an information acquisition destination, and is put on the candidate list 112. Further, if emails have been exchanged with another member of the group to which the user belongs a predetermined number of times or more, the other-end party may be put on the candidate list 112. Furthermore, a combination of the above-mentioned conditions may be employed. A standard for such selection are hereinafter referred to as a selection rule.

The URL generating section 130 has an URL candidate-generating section 131, and an URL confirmation registration section 132, and functions as the information location-generating section 1e. The URL candidate-generating section 131 reads out the email addresses of the information acquisition destinations which are set on the candidate list 112 by the acquisition destination-selecting section 120, and extracts the domain names. Then, URL candidates of which the URLs are predicted are generated by using the extracted domain names. The URL confirmation registration section 132 determines whether or not the URL candidates generated by the URL candidate-generating section 131 exist in the internet e.g. by actually accessing them. If the existence of an URL is confirmed, the corresponding URL candidate is registered in the URL accumulated information 113 as an information acquisition destination. The URL accumulated information 113 stores the URL in association with the user and the identified information acquisition destination.

The URL deleting section 140 has a sending-receiving situation-confirming section 141 and a deletion determining section 142, and deletes, from the URL accumulated information 113, the URLs of information acquisition destinations which are registered in the URL accumulated information 113 and with which emails are not exchanged. The sending-receiving situation-confirming section 141 reads out the communication log 111, and confirms a sending-receiving situation, i.e. whether or not emails have been exchanged between the user and each information acquisition destination both registered in the URL accumulated information 113. Based on the result of confirmation by the sending-receiving situation-confirming section 141, if emails are not exchanged within a predetermined time period, the deletion determining section 142 deletes the corresponding URL registration record from the URL accumulated information 113. Further, if required, the corresponding URL registration record is also deleted from the crawling destination list of the RSS reader 300.

The RSS reader registration section 150 updates the crawling destination list having registered therein the crawling destinations of the RSS reader 300 of each of the terminals 12a and 12b, based on the URL accumulated information 113 stored in the storage section 110.

Now, a description will be given of information stored in the storage section 110. FIG. 5 is a diagram of an example of the communication log.

The communication log 1110 includes information items, such as email addresses 1112 of respective senders, email addresses 1113 of respective recipients as destinations, subjects 1114, and dates 1115. It should be noted that IDs 1111 for identification are given to respective sets of records, for illustrative purposes.

Here, one reciprocated pair of emails is defined as a combination of at least one pair of emails which have the same subject 1114, and at the same time in which email addresses set to the sender 1112 and the destination 1113 in one email are set to the destination 1113 and the sender 1112 in the other email. For example, ID=1 of ID=1 and ID=2 which are connected by a dotted line 1116 is an email with the subject "S1" which is sent from "A1@a.co.jp" to "B1@b.co.jp". Inversely, ID=2 is an email with the subject "S1" which is sent from "B1@b.co.jp" to "A1@a.co.jp". The email which is recorded as ID=1 of such a communication log and the email which is recorded as ID=2 are one reciprocated pair of emails. In FIG. 5, a pair of emails like this are connected by a dotted line 1116.

FIG. 6 is a diagram of an example of a candidate list.

The candidate list 1120 registers email addresses of other-end parties which are selected as the information acquisition destinations by the acquisition destination-selecting section 120. The candidate list 1120 includes information items, such as users 1122 and destinations 1123. IDs 1121 are given to respective sets of records, similarly to the communication log 1110. The email address of each user is registered as the user 1122. In the present embodiment, users in Company B system 10 are each referred to as the user, and hence the user is indicated by Bn (n is an arbitrary integer). The email address of each other-end party which is selected as an information acquisition destination is registered as a destination 1123.

FIG. 7 is a diagram of an example of URL accumulated information.

The URL accumulated information 1130 registers the URLs of information acquisition destinations which are generated by the URL generating section 130. The URL accumulated information 1130 has information items, such as users 1132, destinations 1133, and collecting destinations 1134. IDs 1131 are given to respective sets of records, similarly to the communication log 1110. Further, the users 1132 and the destinations 1133 are same as the users 1122 and the destinations 1123 in the candidate list 1120. The URL which is generated based on the email address of each destination 1123 by the URL generating section 1130 and confirmed to exist is registered as a collecting destination 1134.

Hereinafter, descriptions will be given in detail of processes which are executed by the acquisition destination-selecting section 120, the URL generating section 130, the RSS reader registration section 150, and the URL deleting section 140, using the above-mentioned various items of information stored in the storage section 110.

The acquisition destination-selecting section 120 identifies other-end parties with whom the user frequently exchanges emails based on the communication log 1110, and selects ones of the other-end parties who satisfy predetermined conditions as the information acquisition destinations. Here, a description will be given of two cases: selection rule 1 and selection rule 2. According to the selection rule 1, selection is carried out based on the number of times of transmission and reception of emails which are directly exchanged between the user and an other-end party within a predetermined time period. For example, it is a rule that emails have been directly exchanged more than once within a week. Further, according to the selection rule 2, selection is carried out not only based on the situation of communication of an other-end party with the user, but also taking into account the situation of communication of the other-end party with other members who belong to the same group as the user. For example, it is a rule that emails have been directly exchanged within a week, and emails have been exchanged with other users more than once.

FIGS. 8A and 8B are diagrams of examples of an acquisition destination-selecting process. FIG. 8A shows a case in which the selection rule 1 is applied, and FIG. 8B shows a case in which the selection rule 2 is applied. Here, the user is illustrated as B1 (the user's email address is "B1@b.co.jp").

[FIG. 8A] When the selection rule 1 "emails have been directly exchanged more than once within a week" is applied, the other-end party which has exchanged emails with the user B1 ("B1@b.co.jp") within the past one week since November 28 is extracted from the communication log 1110. In ID=1 and ID=2, it is recorded that emails were exchanged with the destination "A1@a.co.jp" on the subject "S1". In ID=4 and ID=5, it is recorded that emails were exchanged with the destination "A1@a.co.jp" on a subject "S3". In ID=6 and ID=7, it is recorded that emails were exchanged with the destination "A2@a.co.jp" on a subject "S4". Although in ID=8 and ID=13, it is recorded that emails were exchanged with the destination "A1@a.co.jp" on a subject "S5", the condition of "within a week" is not satisfied. Thus, "A1@a.co.jp" and "A2@a.co.jp" are extracted as destinations. Further, since emails between the user "B1@b.co.jp" and "A1@a.co.jp" have been exchanged two times, which satisfies the condition of more than once, and hence "A1@a.co.jp" is registered in the candidate list. However, emails between the user "B1@b.co.jp" and "A2@a.co.jp" were exchanged once, which does not satisfy the condition of more than once, and hence "A2@a.co.jp" is not registered in the candidate list. From the above, the destination "A1@a.co.jp" is registered in association with the user "B1@b.co.jp" in the candidate list (selection rule 1) 1120*a*.

It should be noted that the condition of matching in a subject is assumed to be a partial item match. Actually, subjects of emails which are sent and received do not always match each other. For example, "RE:" indicating that an email is a response is sometimes added to a subject. Therefore, if a certain degree of match is found between subjects, they are regarded as the same subject. It may be configured such that the character strings of subjects are subjected to morpheme analysis, and if the ratio of a matching portion of the character string of a subject to the whole character string is more than a predetermined value, the subject is regarded as the same subject.

[FIG. 8B] When the selection rule 2 "emails have been directly exchanged within a week, and have been exchanged with other users more than once" is applied, similarly to the above, "A1@a.co.jp" and "A2@a.co.jp" are extracted as destinations. As for "A1@a.co.jp" out of these, communication has not been performed with the other users (B2, B3) who belong to the same group as the B1 within a week. Therefore, this address is not registered in the candidate list (selection rule 2) 1120*b*. On the other hand, as for "A2@a.co.jp", it is recorded in ID=9 and ID=10 that emails were exchanged with the user "B2@b.co.jp" on a subject "S6". Similarly, it is recorded in ID=11 and ID=12 that emails were exchanged with the user "B3@b.co.jp" on a subject "S7". Therefore, the selection rule 2 is satisfied. In this case, all the users with whom emails have been exchanged are registered in the candidate list. As described above, in the candidate list (selection rule 2) 1120*b*, the destination "A2@a.co.jp" is registered in association with the user "B1@b.co.jp", the user "B2@b.co.jp", and the user "B3@b.co.jp".

As described above, based on the selection rule, registration of information locations in the candidate list is performed. It should be noted that the selection rule is properly configured as to the conditions of a time period for reference, the required number of times of execution of email exchange, whether or not to refer to email exchange with other users, and so on, depending on a system to which the embodiment is applied. Further, for example, using a combination with the selection rule 1 and 2, a destination which meets the conditions of either of them may be registered as a candidate.

By the above-described process, the candidate list 1120 is generated, processing by the URL generating section 130 follows.

Figure 9:
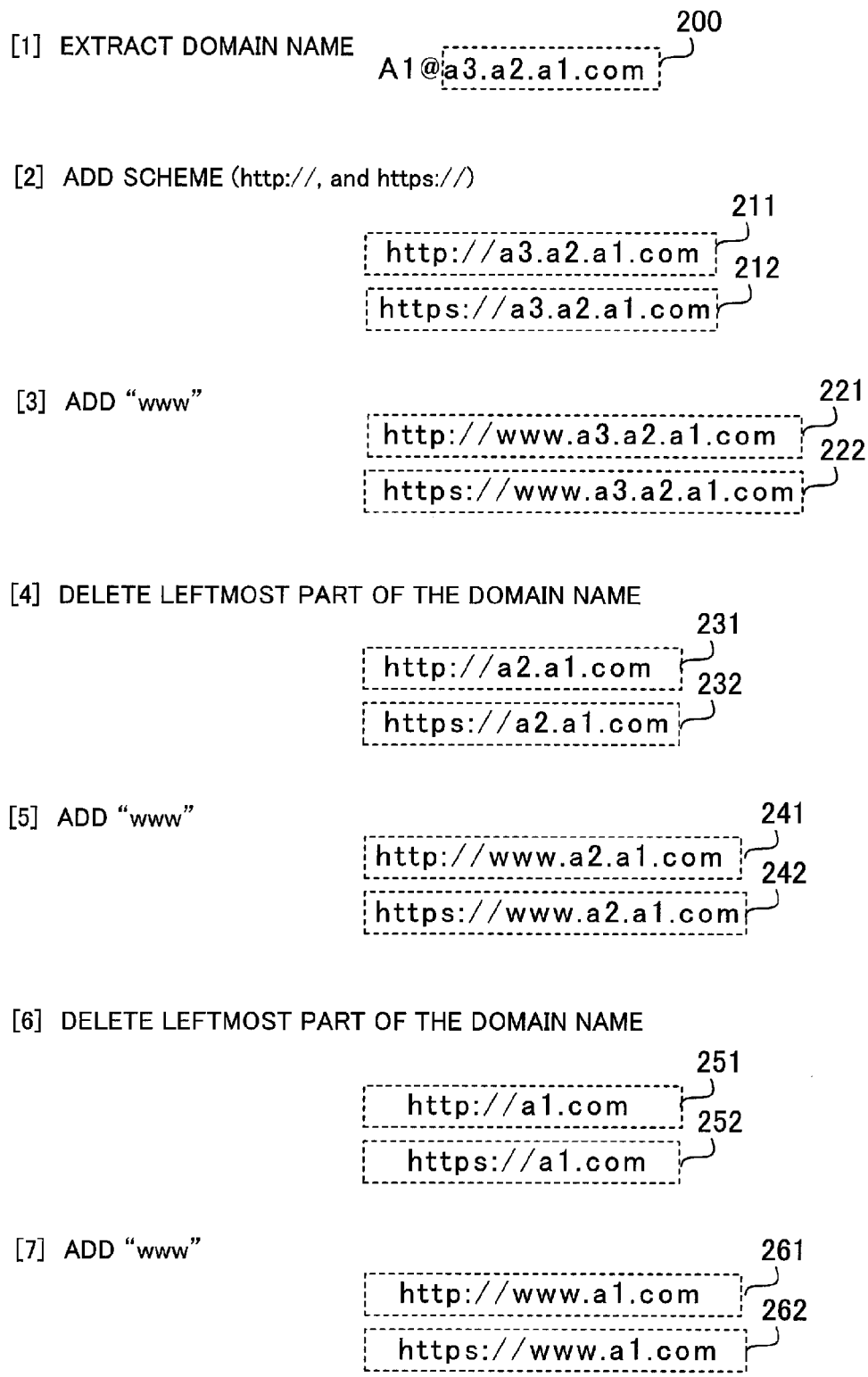
FIG. 9 is a diagram of an example of a URL generation process.

FIG. 9 is a diagram of an example of a URL generation process. In the illustrated example, it is assumed that the candidate list 1120 has the destinations "A1@a3.a2.a1.com" set as an information location. The URL generation process is carried out as follows:

[1] First, a domain name is extracted from the email address of the destination. A part next to @ is the domain name, and in this address, "a3.a2.a1.com" 200 is extracted.

[2] A scheme is added to the extracted domain name "a3.a2.a1.com" 200. For the scheme, there are used, for example, general ones each defining an HTTP protocol "http://" and "https://". This addition creates URL candidates "http://a3.a2.a1.com" 211 and "https://a3.a2.a1.com" 212.

It is determined whether or not the URL candidates which are thus generated exist on the Internet 40. Each of the URLs is accessed, and it is determined whether or not the URL exists according to whether the access is successful or unsuccessful. If the access is successful, the corresponding URL candidate is registered in the URL accumulated information 1130. If the access is unsuccessful, next URL candidates are generated.

[3] In the next URL candidates, a character string corresponding to the service provided by the domain is added to the left end of the domain name of the preceding candidate. The service provided by the website as a target of information collection is www, and hence "www." is added. Here, by adding "www." to "http://a3.a2.a1.com" 211 and "https://a3.a2.a1.com" 212, "http://www.a3.a2.a1.com" 221 and "https://www.a3.a2.a1.com" 222 are generated. These URLs are accessed, and it is determined whether or not the URLs exist by confirming whether the access is successful or unsuccessful. If the access is successful, the corresponding URL candidate is registered in the URL accumulated information 1130. If the access is not successful, next URL candidates are generated.

[4] The next URL candidates are generated by deleting part of the domain name. In general, it is known that a domain name based on a name of organization has a predetermined hierarchical structure, and the leftmost part corresponds to the bottom of the hierarchy of the organization. Then, the URL candidate is generated by deleting a character string corresponding to the bottom of the hierarchy. In an upper level of the hierarchy, it is presumed that the possibility of existence of the URL becomes higher. Here, "www." and part of the domain name from the leftmost to ".(period)" of the preceding candidate are deleted. In the illustrated example, "www." and "a3." are deleted from "http://www.a3.a2.a1.com" 221 and "https://www.a3.a2.a1.com" 222, to thereby create "http://a2.a1.com" 231 and "https://a2.a1.com" 232. Each of these URLs is accessed, and if the access is successful, the corresponding URL candidate is registered in the URL accumulated information 1130. If the access is unsuccessful, next URL candidates are generated.

[5] In the next URL candidates, "www." is added to the leftmost of the preceding candidate domain name. In the present embodiment, "www." is added to "http://a2.a1.com" 231 and "https://a2.a1.com" 232, whereby "http://www.a2.a1.com" 241 and "https://www.a2.a1.com" 242 are generated. Each URL is accessed, and it is determined whether or not the URL exists by confirming whether or not the access is successful. If the access is successful, the corresponding URL candidate is registered in the URL accumulated information 1130. If the access is unsuccessful, next URL candidates are generated.

[6] In the next URL candidates, "www." and part of the domain name from the leftmost to "." of the preceding candidates are deleted. In the illustrated example, "www." and "a2." are deleted from "http://www.a2.a1.com" 241 and "https://www.a2.a1.com" 242, whereby "http://a1.com" 251 and "https://a1.com" 252 are generated. Each of the URLs is accessed, and it is determined whether or not the URL exists by confirming whether or not the access is successful. If the access is successful, the corresponding URL candidate is registered in the URL accumulated information 1130. If the access is unsuccessful, next URL candidates are generated.

[7] In the next URL candidates, "www." is added to the leftmost of the preceding candidate domain name. In the present embodiment, "www." is added to "http://a1.com" 251 and "https://a1.com" 252, whereby "http://www.a1.com" 261 and "https://www.a1.com" 262 are generated. Each of the URLs is accessed, and it is determined whether or not the URL exists by confirming whether or not the access is successful. If the access is successful, this URL candidate is registered in the URL accumulated information 1130. If the access is unsuccessful, since it is not possible to delete any more, the generation of URLs is terminated.

As described above, URL candidates are generated by using domain names which are extracted from email addresses. If it is determined that the URLs exist on the Internet 40, these URLs are registered in the URL accumulated information 1130.

The URLs which are thus registered in the URL accumulated information 1130 are delivered to the RSS reader 300. The RSS reader registration section 150 registers the URLs which are newly registered in the URL accumulated information 1130, in the RSS reader 300.

FIGS. 10A and 10B are examples of a list after RSS reader registration.

In the illustrated example, it is assumed that the user of ID=1 "B1@b.co.jp", the collecting destination URL "http://a.co.jp", the user of ID-2 "B2@b.co.jp", and the collecting destination URL http://a.co.jp, which have been registered in the URL accumulated information 1130 shown in FIG. 7 are newly registered.

Taking a list 310 of the user B1, for example, the RSS list has information items, such as titles 310a of respective sites, URLs 310b which show the respective information locations of the sites, and saving destination folders 310c in which the obtained information is saved. This is also similar as for the user B2.

If "http://a.co.jp" is not registered in the list of the RSS reader 300 of each of the users B1 and B2, the RSS reader registration section 150 registers the same in the list. If the title of the site can be obtained from the address information of emails or the like, it is used. As a result, the URL "http://a.co.jp" 311 of A Co. Inc. is newly registered in the list 310 of the user B1. Similarly, the URL "http://a.co.jp" 321 of A Co. Inc. is newly registered in the list 320 of the user B2.

The RSS reader 300 of each user adds the newly registered URL "http://a.co.jp" of A Co. Inc. to the automatically crawling sites to thereby collect information. Thus, information concerning the other-end parties with whom emails are frequently exchanged is automatically collected.

By the way, with changes in business, there is a case in which information on an other-end party registered in the destination list of information locations from which information is desired to be acquired becomes no longer necessary. In such a case, it is predicted that email exchange with the other-end party is terminated. The URL deleting section 140 checks an email exchange situation, and if emails are not exchanged within a predetermined time period, the corresponding destination is deleted from the URL accumulated information 1130. If required, the corresponding destination is deleted also from the crawling list of the RSS reader 300.

For example, in ID=1 of the URL accumulated information 1130 shown in FIG. 7, the collecting destination URL "http://a.co.jp" is registered in association with the user "B1@b.co.jp" and the destination "A1@a.co.jp". The URL deleting section 140 searches the communication log 1110 to check whether or not emails are sent and received with a combination of the user "B1@b.co.jp" and the destination "A1@a.co.jp". It is assumed here that the system is configured such that the destination is deleted if emails are not exchanged for ten days. It should be noted that a time limit for deletion is randomly set. In the communication log 1110, it is recorded that emails were exchanged between the user "B1@b.co.jp" and the destination "A1@a.co.jp" within ten days (e.g. ID=1 and ID=2). Therefore, the registration records are maintained. If the registration records in the URL accumulated information 1130 are sequentially checked in the same way, email exchange between the user of ID=5 "B2@b.co.jp" and the destination "C1@xxx.co.jp" is not detected from the communication log 1110. It is determined that the last emails were sent and received between the user of ID=5 "B2@b.co.jp" and the destination "C1@xxx.co.jp" more than ten days ago, and hence the records of ID=5 are deleted from the URL accumulated information 1130. Further, the corresponding registration records in the crawling list of the RSS reader of the user B2 are also deleted. Thus, the destinations with which email exchange has not been performed within a predetermined time period are deleted from the information collecting destinations.

It should be noted that the system may be configured such that the URL deleting section 140 performs deletion of registration records in the crawling list of the RSS reader of each user, not automatically but after notifying the user that emails have not been exchanged with the destination within a predetermined time period and thereby inquiring whether or not the user approves deletion of the registration records.

Next, a description will be given of the processing procedure performed based on the method of managing locations of information, by the information location management device 11, using flowcharts.

Figure 11:
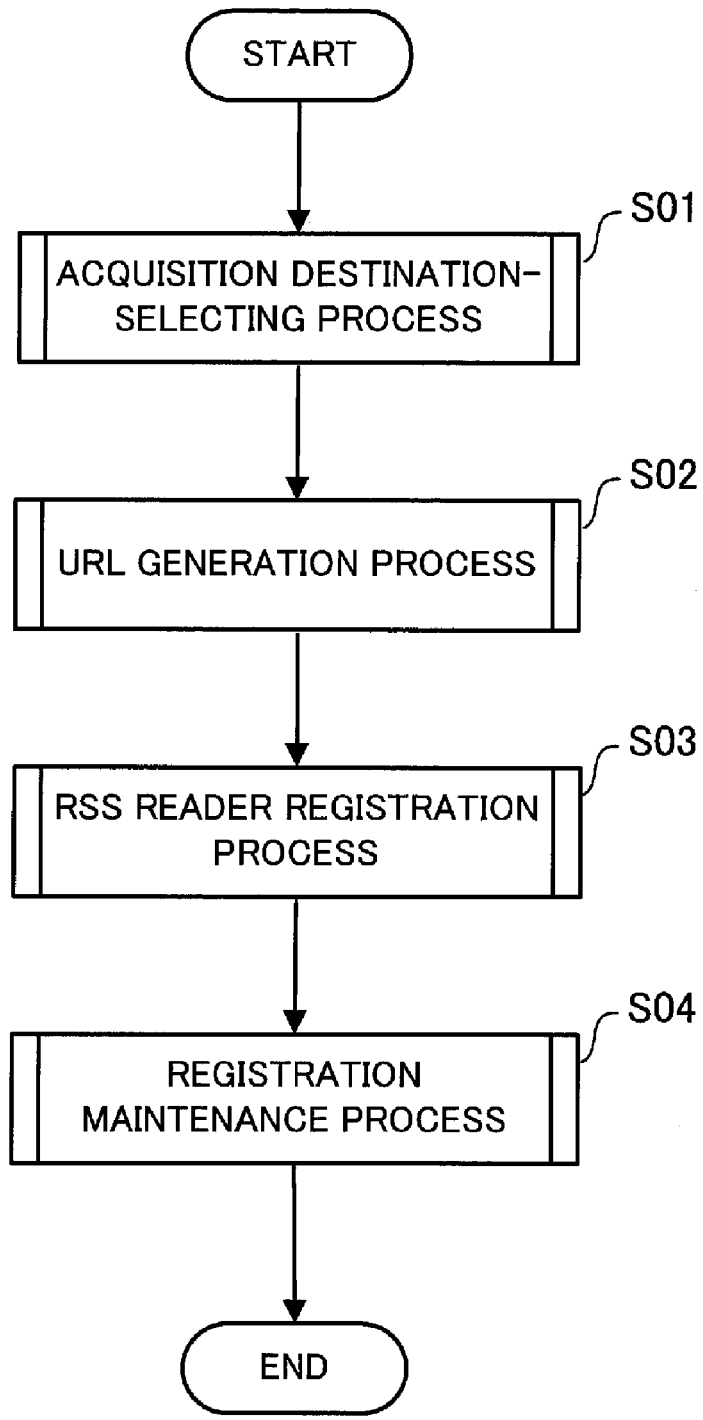
FIG. 11 is a flowchart of an outline of an information location management process.

FIG. 11 is a flowchart of an outline of an information location management process.

The process is started at a predetermined repetition period.

[Step S01] The acquisition destination-selecting process for selecting information acquisition destinations is carried out using the communication log 111 recording email exchanges to generate a candidate list 112 of the selected information acquisition destinations.

[Step S02] Based on the candidate list 112 generated by the acquisition destination-selecting process in the step S01, the URL generation process for generating URLs of the information acquisition destinations is carried out. The generated URLs are registered in the URL accumulated information 113 in which the URLs of the information collecting destinations are accumulated.

[Step S03] Based on the URL accumulated information 113, URLs which are newly detected are registered in the crawling list of the RSS reader of each associated user.

[Step S04] The email communication situation with each of destinations registered in the URL accumulated information 113 is checked. If emails have not been exchanged within a predetermined time period, a registration maintenance process for deleting the corresponding records from the URL accumulated information 113 is carried out. At the same time, the registration records in the list of the RSS reader of each user are also updated.

It should be noted that, although in the above-described processes, the registration maintenance process (step S04) is executed in succession to the steps S01 to S03 for registering new information locations, the registration maintenance process may be carried out in other timing.

Next, details of each of the processes will be described.

Figure 12:
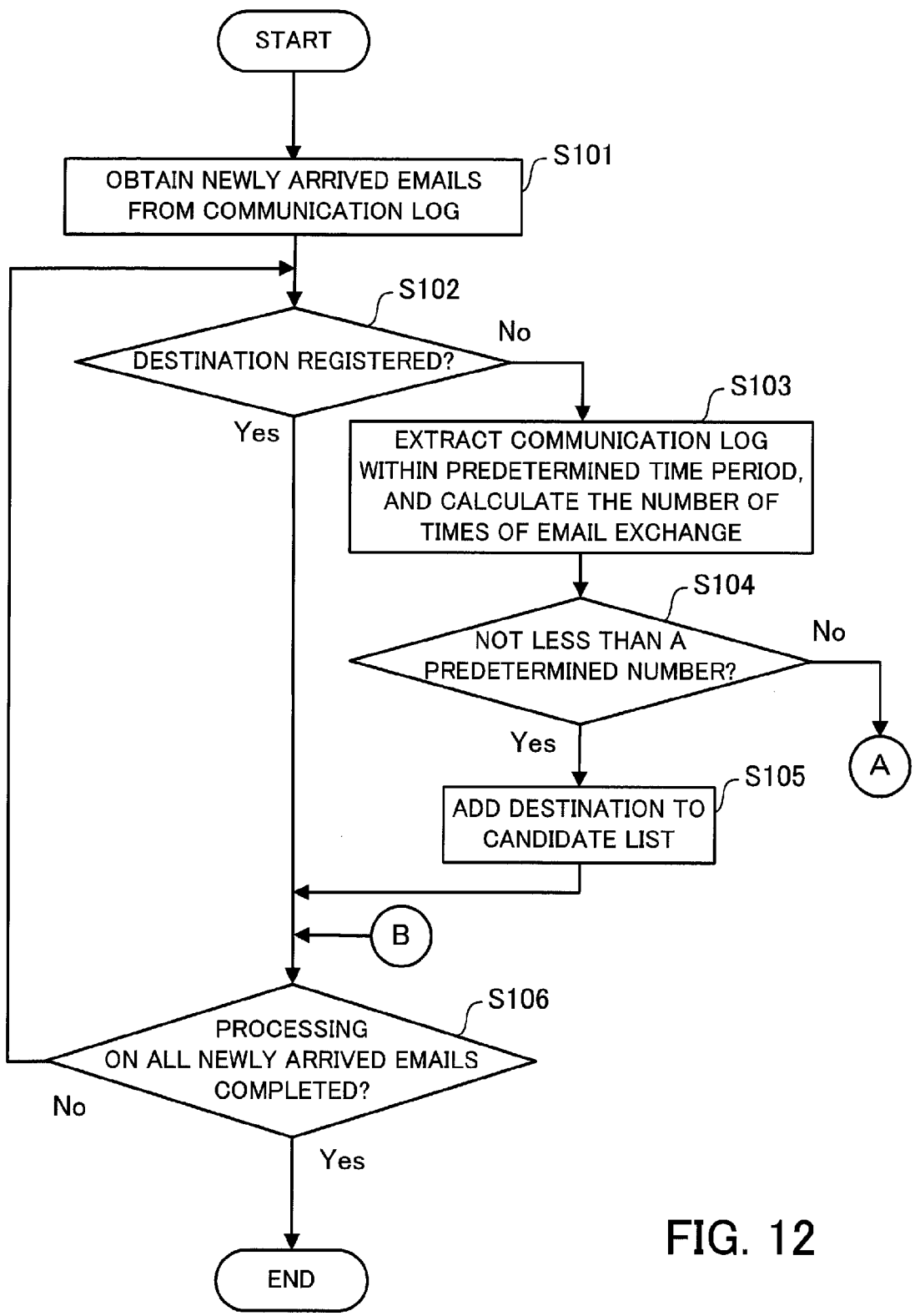
FIG. 12 is a flowchart of an acquisition destination-selecting process.
Figure 13:
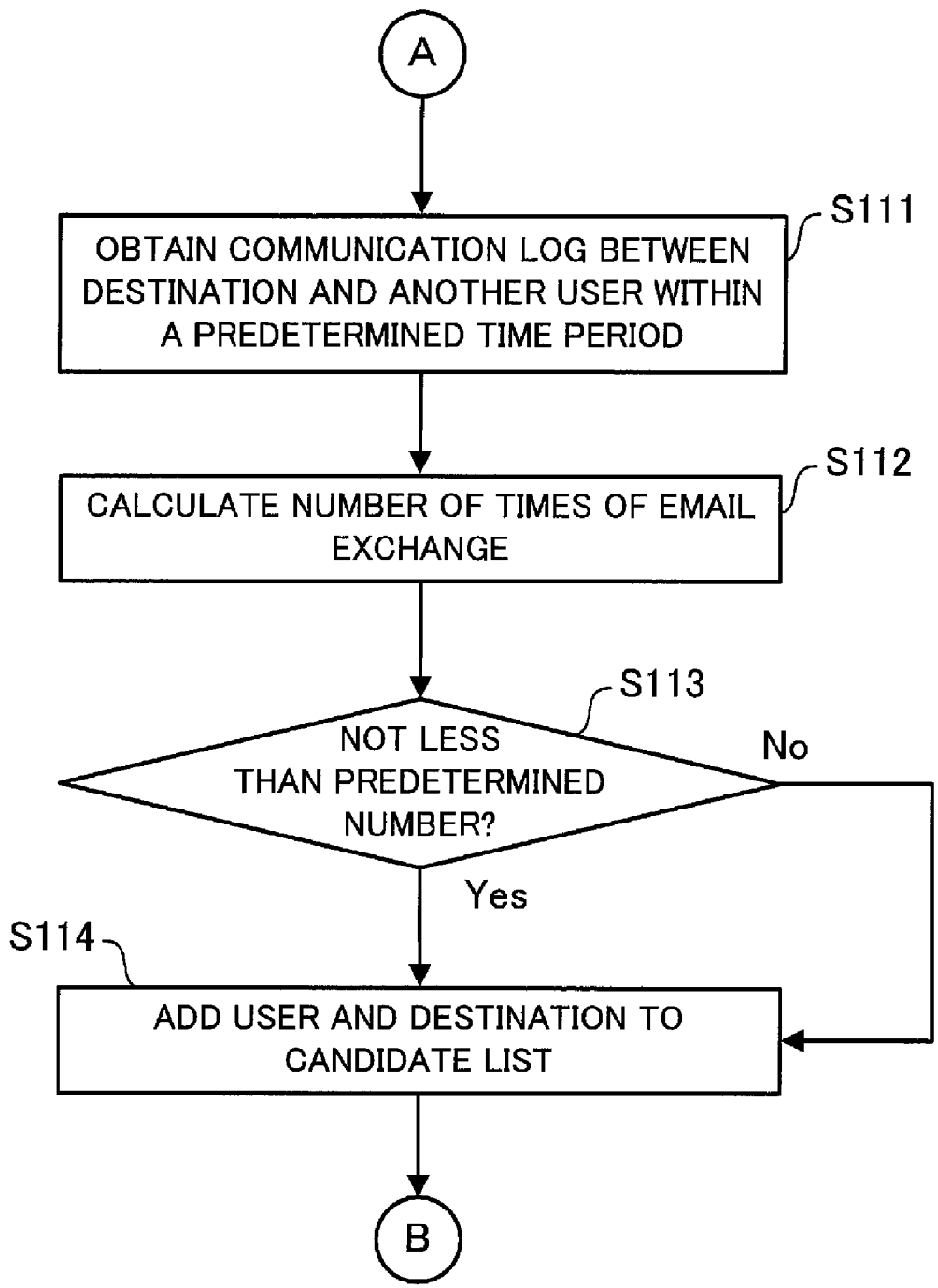
FIG. 13 is a flowchart of the acquisition destination-selecting process to which selection rule 2 is applied.

FIG. 12 is a flowchart of the acquisition destination-selecting process. Here, first, the selection rule 1 (emails have been directly exchanged between the user and an other-end party not more than a predetermined number of times) is applied to the detected destination, and further, as to each destination which does not satisfy the selection rule 1, a process for determining whether or not the selection rule 2 (emails have been directly exchanged with the user, and have been exchanged with other members of the same group to which the user belongs more than a predetermined number of times) is satisfied is carried out. It should be noted that a process based on the selection rule 2 is shown in FIG. 13.

[Step S101] A record of email exchange situation concerning the newly arrived emails which have not been processed is obtained from the communication log 111.

[Step S102] Based on the record of the email exchange situation of the obtained newly arrived emails, a destination is extracted as to a user whose communication records are found in the record of the email exchange situation as a target. The destination of an other-end party with whom the target user has exchanged at least one reciprocated pair of emails or more is extracted, and it is determined whether or not the destination has been registered in the candidate list 112 or the URL accumulated information 113. If the destination has not been registered, the process proceeds to a step S103. If the destination has been registered, the process proceeds to a step S106.

[Step S103] The communication log within the predetermined time period is extracted, and the number of times of execution of email exchange between the target user and the other-end party is calculated.

[Step S104] It is determined whether or not the number of times of execution of email exchange calculated in the step S103 is not less than a predetermined number. If it is not less than the predetermined number, the process proceeds to a step S105. If it is less than the predetermined number, the process proceeds to a branch point A shown in FIG. 13.

[Step S105] Since emails have been exchanged between the target user and the extracted destination not less than the predetermined number of times, the destination is added to the candidate list 112.

[Step S106] Since processing on this destination is terminated, it is determined whether or not processing on all newly arrived emails has been completed. If the processing on all newly arrived emails has been completed, the present process is terminated. If the processing has not been completed, the process returns to the step S102, and the procedure is started over again from the extraction of a next destination.

FIG. 13 is a flowchart of the acquisition destination-selecting process to which selection rule 2 is applied. The process continued from the branch point A in FIG. 12 is started.

[Step S111] A record concerning email exchange within a predetermined time period between the destination and another user who belongs to the same group as the user is obtained from the communication log.

[Step S112] The number of times of execution of email exchange between the other user and the destination is calculated.

[Step S113] It is determined whether or not the number of times of execution of email exchange between the other user and the destination calculated in the step S112 is not less than a predetermined number. If it is not less than the predetermined number, the process proceeds to a step S114. If it is less than the predetermined number, the process proceeds to a branch point B in FIG. 12.

[Step S114] Since emails have been exchanged a certain times or more between the other user who belongs to the same group as the target user and the extracted destination, the other member is added to the users, and the user and the destination are added to the candidate list 112. Returning to the branch point B in FIG. 12, the process is continued from the step S106 for determining whether or not the processing (checking) on all newly arrived emails has been completed.

By carrying out the above-described process, based on the selection rules, the information locations as targets from which information is acquired are registered in the candidate list.

Figure 14:
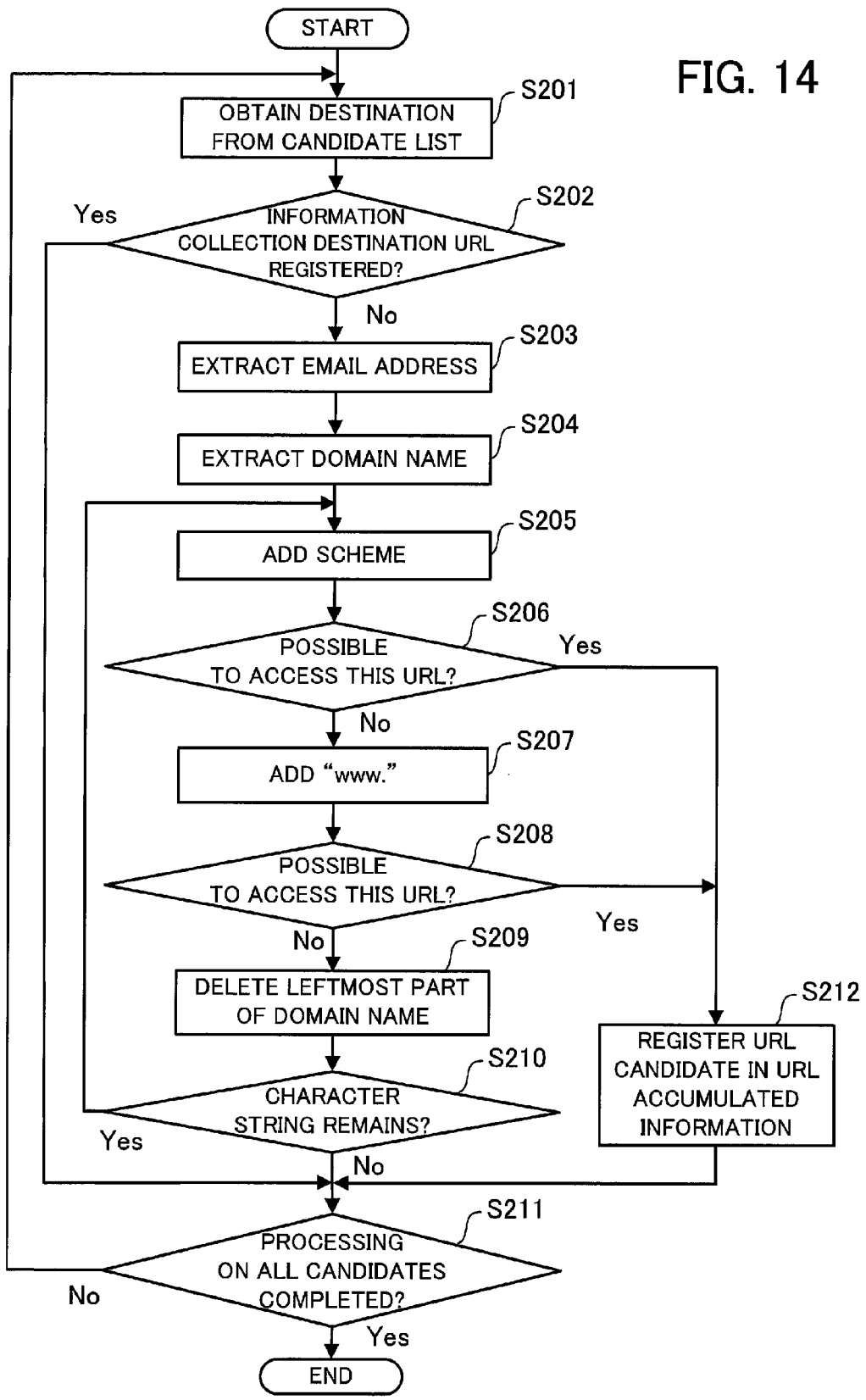
FIG. 14 is a flowchart of the URL generation process.

FIG. 14 is a flowchart of the URL generation process.

[Step S201] The candidate list 112 is read out to obtain a destination.

[Step S202] By checking the destination against the URL accumulated information 113, it is determined whether or not a URL as an information collection destination associated with the user and the destination is registered. If the URL is not registered, the process proceeds to a step S203. If the URL is registered, the process proceeds to a step S211.

[Step S203] The email address of the destination is extracted from the candidate list 112.

[Step S204] The domain name is extracted from the email address of the destination extracted in the step S203. The domain name is a character string following @ mark of the email address.

[Step S205] By adding a scheme to the domain name, a URL candidate is generated. As a scheme, for example, "http://" or "https://" which defines HTTP protocol is used.

[Step S206] Using the URL candidate generated in the step S205, it is checked whether or not it is possible to access this URL. If it is impossible to access the URL, the process proceeds to a step S207. If it is possible to access the URL, the process proceeds to a step S212.

[Step S207] When it is impossible to access the URL candidate generated in the step S205, "www." is added to the leftmost of the domain name.

[Step S208] Using the URL candidate generated in the step S207, it is checked whether or not it is possible to access this URL. If it is impossible to access the URL, the process proceeds to a step S209. If it is possible to access the URL, the process proceeds to a step S212.

[Step S209] If it is impossible to access the URL candidate generated in the step S207, part of the domain name from the leftmost to the next period is deleted. By this process, the bottom of the hierarchy of the domain name is deleted.

[Step S210] It is determined whether or not there is a remaining portion of the character string after the deletion in the step S209. If there is no remaining portion of the character string, URL generation is terminated, and the process proceeds to a step S211. If there is a remaining portion of the character string, the process proceeds to the step S205, to repeat the process using the domain name modified in the step S209.

[Step S211] It is determined whether or not the processing on all candidates registered in the candidate list 112 has been completed. If the process has not been completed, the process returns to the step S201 to carry out the processing on a next destination. If the processing on all candidates has been completed, the present process is terminated.

[Step S212] Since it is confirmed that the generated URL candidate exists on the network, this URL candidate is registered in the URL accumulated information 113.

By carrying out the above-described process, the URLs of other-end parties which are registered in the candidate list based on the record of email exchange are generated, and accumulated in the URL accumulated information 113.

Figure 15:
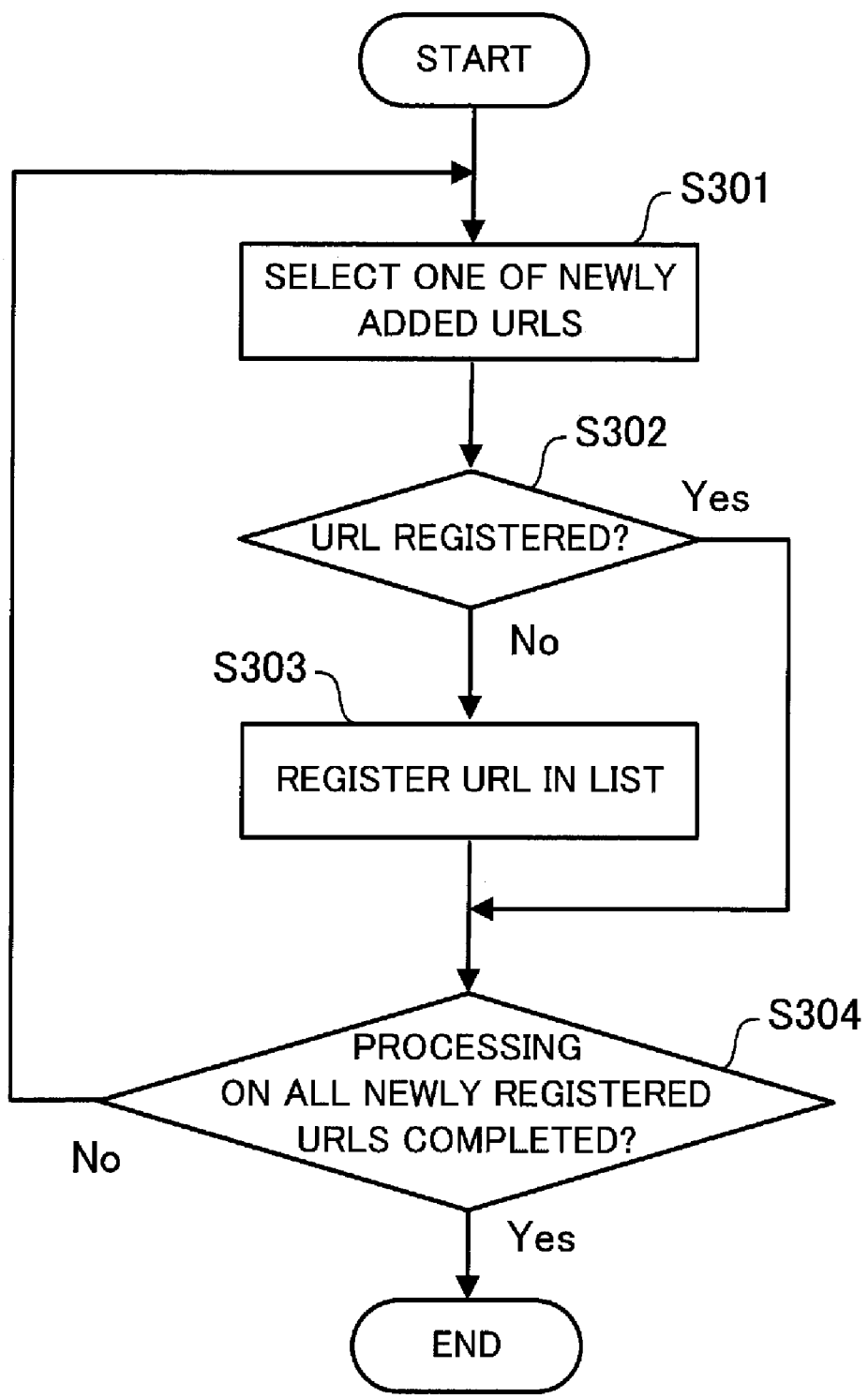
FIG. 15 is a flowchart of an RSS reader registration process.

FIG. 15 is a flowchart of an RSS reader registration process.

[Step S301] One of URLs which are newly added to the URL accumulated information 113 is selected.

[Step S302] It is determined whether or not the URL selected in the step S301 is registered in the crawling list of the RSS reader of a user. If the URL is not registered, the process proceeds to a step S303. If the URL is registered, the process proceeds to a step S304.

[Step S303] If the URL is not registered, the URL which is selected in the step S301 is registered in the crawling list of the RSS reader.

[Step S304] It is determined whether or not processing on all the URLs newly registered in the URL accumulated information 113 has been completed. If the processing has not been completed, the process proceeds to the step S301 to carry out the processing on a next newly registered URL. If the processing has been completed, the present process is terminated.

By executing the above-described process, it is possible to collect information concerning other-end parties with whom emails are frequently exchanged, by the RSS reader of each user.

There is a case that the URLs which are registered in the URL accumulated information 113 and the crawling list of the RSS reader become unnecessary with the lapse of time.

Figure 16:
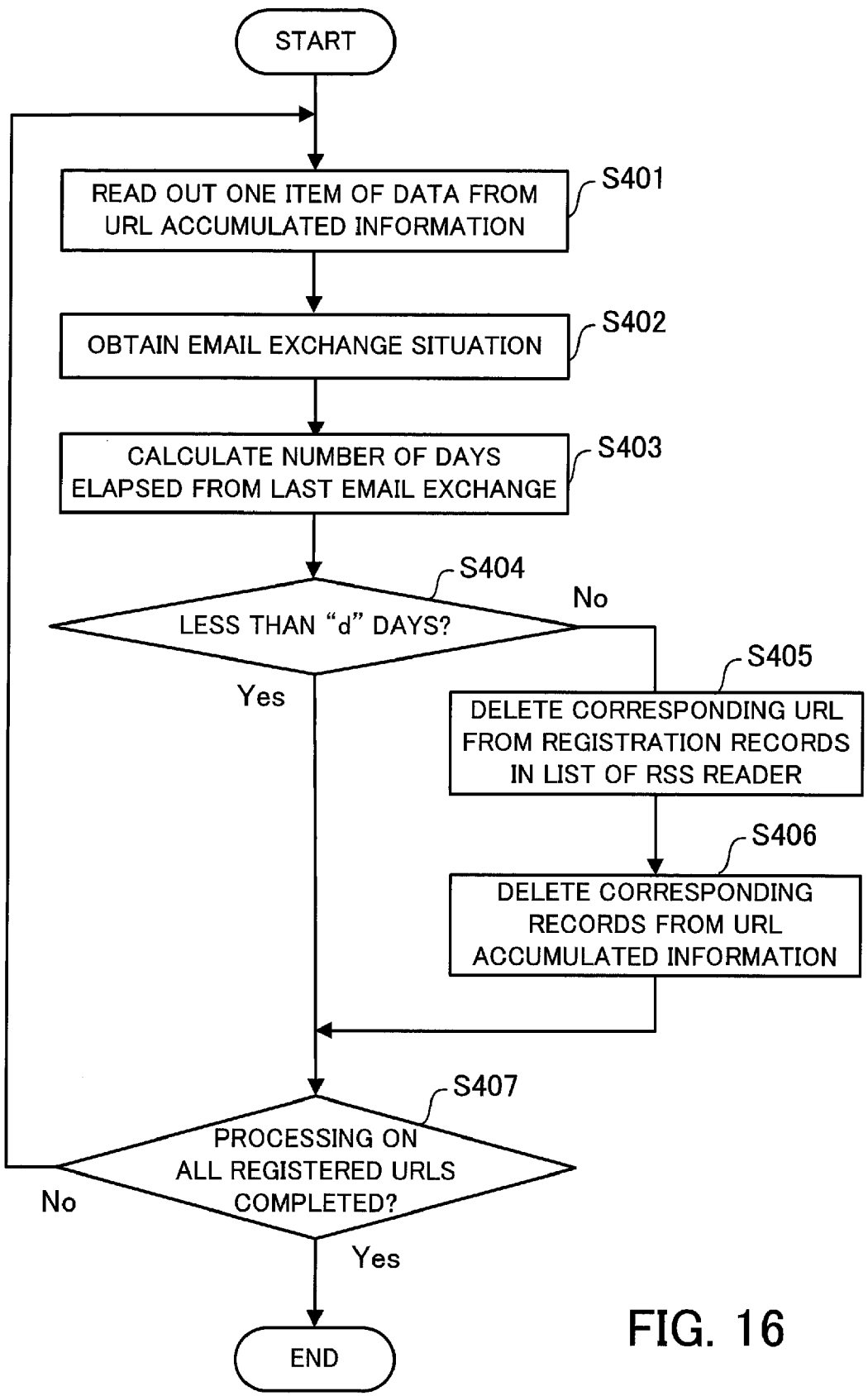
FIG. 16 is a flowchart of a registration maintenance process.

FIG. 16 is a flowchart of the registration maintenance process.

[Step S401] Email addresses of the user and the destination are obtained by reading out one item of data from the URL accumulated information.

[Step S402] The communication log 111 is read out, to obtain an email exchange situation as to whether or not email exchange has been carried out between the user and the destination obtained in the step S401.

[Step S403] Based on the email exchange situation, the latest date on which an email was exchanged between the email address of the user read out in the step S401 and the email address of the destination is extracted. Then, the number of days elapsed from the last email exchange is calculated.

[Step S404] It is determined whether or not the number of the elapsed days is less than a predetermined number (in the FIG. 16, the number of days is represented by "d"). If the number of the elapsed days is not less than the predetermined number, the process proceeds to a step S405. If the number of elapsed days is less than the predetermined number of days, the process proceeds to a step S407.

[Step S405] If the number of days elapsed from the last email exchange is not less than the predetermined number, the corresponding URL is deleted from the registration records in the list of the RSS reader of the target user.

[Step S406] Then, the corresponding records are deleted from the URL accumulated information 113. Thus, the destination and the collecting destination URL registered in the URL accumulated information 113 in association with the target user are deleted.

[Step S407] It is determined whether or not the processing on all registered URLs has been completed. If the processing has not been completed, the process returns to the step S401 to do maintenance on a next registered URL. If the processing (maintenance) on all registered URLs has been completed, the present process is terminated.

By carrying out the above-described process, the registration of a URL concerning a destination with which emails have not been exchanged for a predetermined time period is deleted. Thus, unnecessary crawling destinations are deleted from the crawling list of the RSS reader.

Next, a description will be given of a second embodiment. Although in the first embodiment, the email address of an other-end party is used in the URL generating section 130, the body of an email is used in the second embodiment. It should be noted that component elements of processing functions which an information location management device according to the second embodiment has are identical to those of the information location management device according to the first embodiment shown in FIG. 4. Therefore, functions of the second embodiment will be described using reference numerals of component elements shown in FIG. 4.

However, in the URL generating section 130, different processes from the first embodiment are carried out. In the second embodiment, an URL which is mentioned in the body of an email is extracted by the URL candidate-generating section 131, and is set to an URL candidate. Since the URL which is mentioned in the body of an email is an actual URL, if the same URL appears a predetermined number of times or more, the URL confirmation registration section 132 registers the URL in the URL accumulated information 113 as an information location.

A description will be given based on an example. FIG. 17 is a diagram of the example of URL information generated from the bodies of emails.

The URL generating section 130 obtains the body of an email which has been exchanged between the user and an other-end party. Emails 410 and 420 shown in FIG. 17 are examples of the obtained emails. The emails 410 and 420 are emails which the user (the user on the B Company system 10 side in FIG. 2) has received from the other-end party (the user on the A Company system 20 side in FIG. 2). The mail-address of the user on the A Company system 20 side, i.e. the other-end party is registered as "destination" as shown in the candidate list 1120 in FIG. 6. In the email 410, an URL 411 of the organization to which A1, i.e. the other-end party ("destination" in the candidate list 112, hereinafter, referred to as the same) belongs, is described in signature information. Similarly, in the other email 420, an URL 421 of the organization to which A1 belongs, is described. Thus, it is predicted that the URL which frequently appears in the emails obtained from the same other-end party is one closely related to the user, e.g. a website of the company to which the other-end party belongs. Therefore, if this URL is extracted, and is set to the URL accumulating information 113 as an information location, a useful information location is registered.

Figure 18:
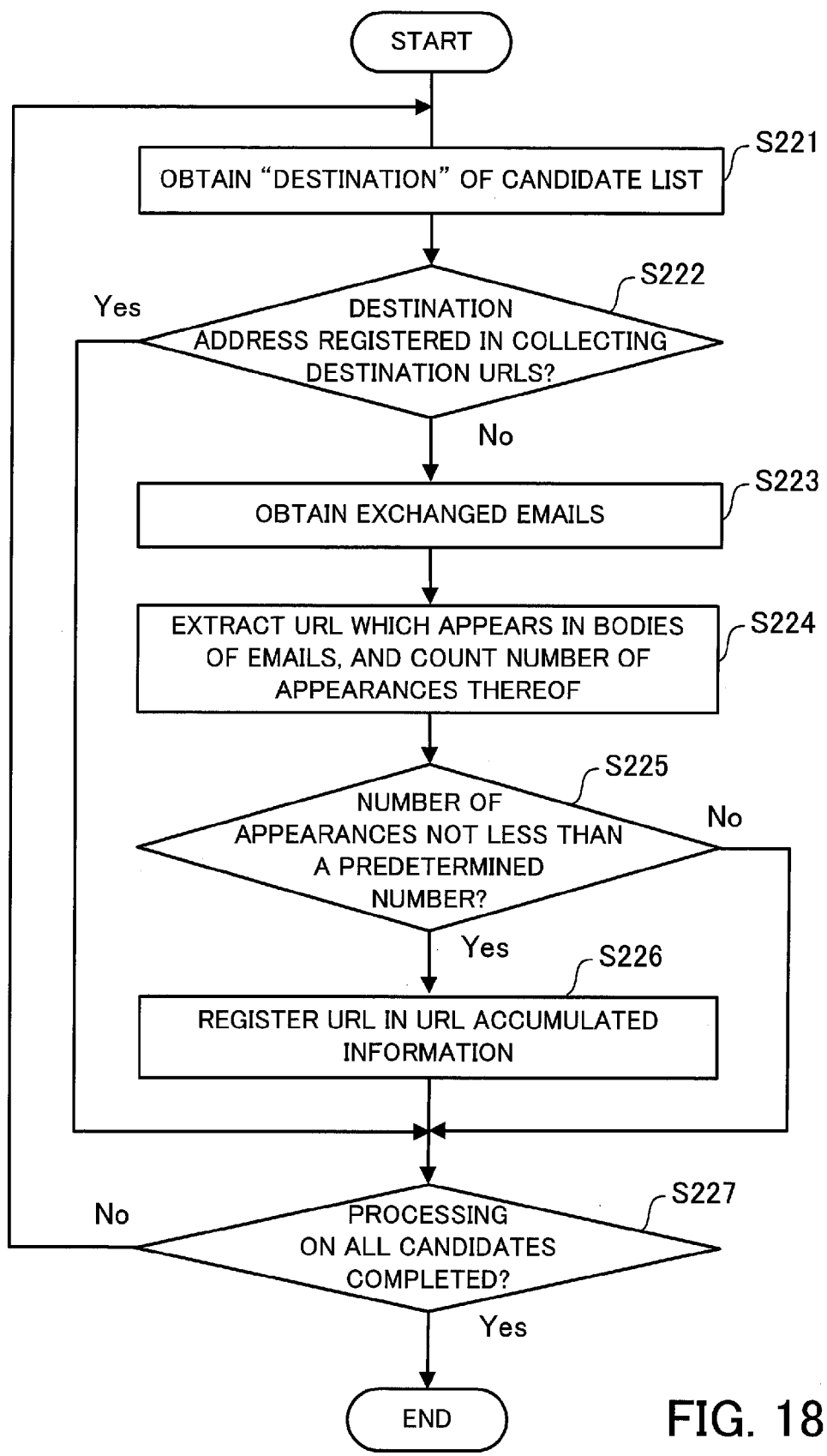
FIG. 18 is a flowchart of an URL generation process executed by an information location management device according to a second embodiment.

FIG. 18 is a flowchart of an URL generation process executed by the information location management device according to the second embodiment.

[Step S221] As an other-end party of emails, a destination address which is registered in "the destination" of the candidate list 112 is obtained.

[Step S222] It is determined whether or not the other-end party (destination address) extracted in the step S221 is registered in the collecting destination URLs of the URL accumulated information 113. If the other-end party is not registered, the process proceeds to a step S223. If the other-end party is registered, the process proceeds to a step S227.

[Step S223] Emails which have been exchanged between the user and the other-end party (destination address) are obtained from the communication log 111.

[Step S224] An URL which appears in the bodies of the emails obtained in the step S223 is extracted, and the number of appearances thereof is counted. When the URL is detected from a plurality of emails, the total number of all appearances of the URL is calculated.

[Step S225] It is determined whether or not the number of appearances calculated in the step S224 is not less than a predetermined number. If the number of appearances is not less than a predetermined number, the process proceeds to a step S226. If it is less than a predetermined number, the process proceeds to a step S227.

[Step S226] The URL which appears a predetermined number of times or more is registered in the URL accumulated information 113, in association with the user and the corresponding destination address.

[Step S227] It is determined whether or not the processing on all candidates registered in the candidate list 112 has been completed. If the processing has not been terminated, the process returns to the step S221 to carry out the processing on a next candidate. If the processing on all candidates has been completed, the URL generating process is terminated.

By carrying out the above-described process, it is possible to register the URLs which frequently appear in the emails from the other-end party with whom emails have been frequently exchanged, in the URL accumulated information 113. The URLs which are registered in the URL accumulated information 113 can be registered in the crawling list of the RSS reader 300 by the RSS reader registration section 150. As a result, it becomes possible to regularly acquire information from the URL which is predicted to be closely related to the other-end party with whom emails have been frequently exchanged. It should be noted that if it is determined that the URL is not necessary, the corresponding URL is deleted from the crawling list, similarly to the first embodiment.

Next, a description will be given of a third embodiment. In the third embodiment, as information based on which an URL is generated, URL registration information of other members is used. It should be noted that component elements of processing functions which an information location management device according to the third embodiment has are identical to the component elements of the information location management device according to the first embodiment shown in FIG. 4. Therefore, a description will be given of functions according to the third embodiment, using reference numerals of the component elements shown in FIG. 4. However, the URL generating section 130 performs different processes from the first and second embodiments.

In the third embodiment, if a URL of a candidate registered in the candidate list 112 is registered in the URL accumulated information 113 in association with another member who belongs to the same group as the user, the URL which is registered in the URL accumulated information 113 is read out. Then, the read URL is registered in the URL accumulated information 113 in association with the user and the other-end party.

FIG. 19 is a diagram of an example of URL information which is generated from registration information of the other user.

[1] In a candidate list-obtaining process, a candidate list 1120c is obtained. In the illustrated example, in the candidate list 1120c which is obtained by the URL generating section 130, the user "B1@b.co.jp" and the destination "A5@a.co.jp" are stored.

Next, [2] in a URL accumulated information-acquiring process, as for the destination "A5@a.co.jp", the URL generating section 130 detects the other members "B2@b.co.jp", "B3@b.co.jp", "B4@b.co.jp", and B5@b.co.jp, as ones which are registered in the URL accumulating information 1130a in association with the destination "A5@a.co.jp". The users B2, B3, B4 and B5 belong to the same group as the user B1 (the email address of B1 is "B1@b.co.jp"). Therefore, the collecting destination URLs, "http://a.co.jp", "http://a/a.co.jp", "http://aaa.a.co.jp" which are associated with these users and the destination "A5@a.co.jp" are extracted from the URL accumulated information 1130a. The duplicates are omitted. Then, these URLs are registered as the collecting destinations of the users in association with the user "B1@b.co.jp" and the destination "A5@a.co.jp". It should be noted that since the URLs have been registered in association with the other members, it is not necessary to determine whether or not these URLs exist on the network.

[3] In a URL accumulated information 1130b in which the URL accumulated information registration has been done, the URLs are registered in respective records of ID=5, ID=6, and ID=7.

As described above, it is also possible to register URLs which have been registered in association with other members.

Figure 20:
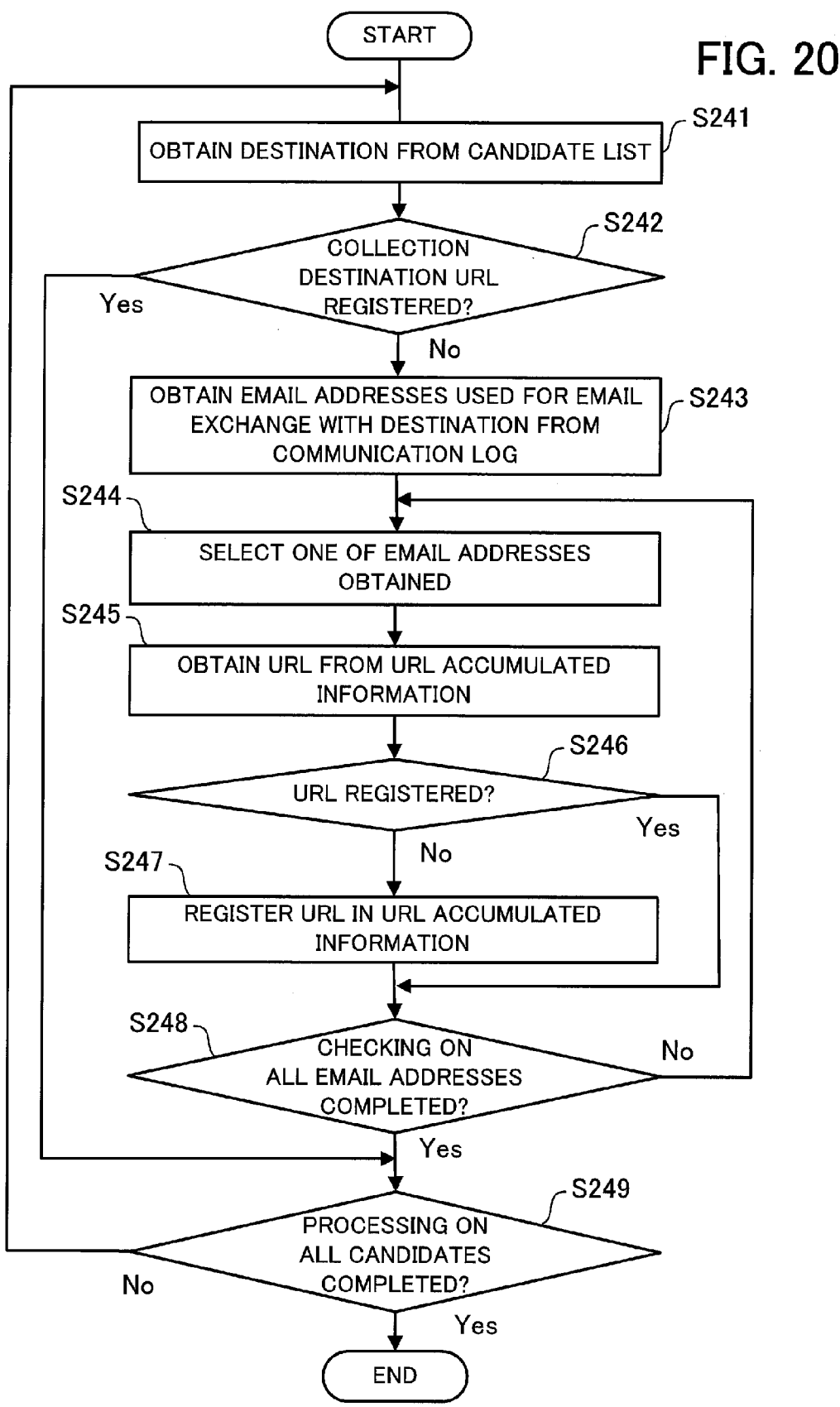
FIG. 20 is a flowchart of an URL generation process executed by an information location management device according to a third embodiment.

FIG. 20 is a flowchart of an URL generation process executed by the information location management device according to the third embodiment.

[Step S241] A destination is obtained from the candidate list 112.

[Step S242] It is determined whether or not the destination which is extracted in the step S241 is registered in the collecting destination URLs of the URL accumulated information 113. If the destination is not registered, the process proceeds to a step S243. If the destination is registered, the process proceeds to a step S249.

[Step S243] Email addresses of other members which have exchanged emails with the destination are obtained from the communication log 111.

[Step S244] One of the email addresses obtained in the step S243 is selected.

[Step S245] By using the email address obtained in the step S244, an URL is obtained from the URL accumulated information 113. That is, an URL in which the email address of another member is registered in the user and the email address of a desired destination is registered in the destination is detected from the collecting destination URL to obtain the URL.

[Step S246] It is determined whether or not the URL obtained in the step S245 has been registered in association with the user in the URL accumulated information 113. If the URL has not been registered, the process proceeds to a step S247. If the URL has been registered, the process proceeds to a step S248.

[Step S247] The URL is registered in the URL accumulated information 113.

[Step S248] It is determined whether or not checking on all email addresses of the other members has been completed. If the checking has not been completed, the process returns to the step S244 to carry out the processing on the email address of a next member.

[Step S249] It is determined whether or not processing on all candidates registered in the candidate list 112 has been completed. If the processing has not been completed, the process returns to the step S241 to carry out the processing on a next user who is registered on the candidate list 112. If the processing has been completed on all candidates, the URL generation process is terminated.

By carrying out the above-described process, a URL which is registered in association with another member is registered in the collecting destination URLs of the corresponding user. As a result, it is possible to regularly obtain information from the URL which is predicted to be closely related to an other-end party with whom emails has been frequently exchanged. It should be noted that if it is determined that the URL becomes unnecessary, the corresponding URL is deleted form the crawling list, similarly to the first and second embodiments.

It should be noted that it is possible to realize the above-described function of processing by a computer. In this case, a program in which content of processing of function to be included in the information location management device is written is provided. By carrying out the program by the computer, the above-described function of processing is realized on the computer. The program in which the content of processing is written can be recorded in a record medium which is capable of being read by the computer.

In case of distributing programs, for example, portable record mediums, such as DVD (Digital Versatile Disc), CD-ROM (Compact Disc Read Only Memory) or the like in which the program is recorded are marketed. Further, it is also possible to store the program in a storing device of a server computer, and transfer the program from the server computer to the other computer via a network.

The computer which carries out the program stores, for example, the program which is recorded in the portable record medium, or is transferred from the server computer in the storing device thereof. Then, the computer reads out the program from the storing device thereof, and carries out processes according to the program. It should be noted that the computer is also capable of directly reading out the program from the portable record medium, and carrying out the processes according to the program. Further, the computer is also capable of carrying out the processes according to the program which is received, each time the program is transferred from the server computer.

According to the disclosed method of managing locations of information and the information location management device, by using the communication log, an information acquisition destination with which email transmission or reception has been executed a predetermined number of times or more is selected. Then, key information is extracted from emails transmitted or received, and based on the key information, information location information concerning the information acquisition destination is generated, and stored in the information location-accumulating section. This makes it possible to acquire the information location information of an other-end party with whom email exchange is performed, and store the same in the information location accumulated information. By using the information, it is possible to easily obtain desired information concerning the other-end party.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A method of managing information locations of predetermined information existing on a network, comprising:
   reading a communication log of emails transmitted and received by a plurality of users within a predetermined time period;
   identifying an other-end party with whom a first user has performed transmission and reception of at least one first reciprocated pair of emails not less than a predetermined number of times;
   selecting the identified other-end party as an information acquisition destination when it is determined that the identified other-end party has performed transmission and reception of at least one second reciprocated pair of emails with a second user who belongs to a same group as the first user;
   extracting, in response to the selecting, key information related to a location of information at the information acquisition destination; and
   generating, based on the extracted key information, information location information indicating the location of the information at the information acquisition destination, and storing the information location information in a storage device, wherein the generating of the information location information includes acquiring an email address of the other-end party as the key information.

2. The method according to claim 1, further comprising:
   identifying another party with whom the first user has performed transmission and reception of emails less than the predetermined number of times during the predetermined time period; and
   selecting said another party as an information acquisition destination based on a communication situation between said another party and a third user belonging to the same group as the first user.

3. The method according to claim 1, wherein the generating of the location candidate includes:
   generating the location candidate by adding a predetermined scheme name to the extracted domain name,
   determining whether the location candidate exists on the network,
   deleting, when the location candidate generated by addition of the scheme name does not exist and the domain name has a predetermined hierarchical structure, a character string corresponding to a bottom of the domain name and adding the scheme name to thereby generate the location candidate, and
   repeating the determining and the deleting until the existence of the location candidate is confirmed or there is no remaining character string of the domain name.

4. The method according to claim 3, wherein the the location candidate includes using http or https defining a HTTP protocol as the scheme name.

5. The method according to claim 3, wherein the generating of the location candidate further includes, when the location candidate does not exist on the network, adding, between the scheme name of the location candidate and the domain name, a character string corresponding to a service provided by a domain having the domain name.

6. The method according to claim 3, wherein the generating of the location candidate includes using www as a character string corresponding to a service provided by a domain having the domain name.

7. The method according to claim 1, wherein the generating of the information location information includes acquiring bodies of emails transmitted or received to or from the information acquisition destination as the key information; when a body of each email contains a predetermined information location, reading out the predetermined information location; and when the predetermined information location appears not less than a predetermined number of times in the bodies of emails, storing the predetermined information location in the storage device.

8. The method according to claim 1, wherein the generating of the information location information includes, by using an email address of the information acquisition destination as the key information, checking whether there is registered the information location information corresponding the email address of the information acquisition destination for a third user belonging to the same group as the first user, and when there is registered, associating the information location information with the first user and registering the information location information in the storage device.

9. The method according to claim 1, further comprising:
   reading an email address of the first user associated with the information location information stored in the storage device, and email address of the information acquisition destination;
   searching, based on the email addresses, the communication log, to calculate an elapsed time from when transmission or reception of an email was executed between the first user and the information acquisition destination last time; and
   deleting, when the elapsed time exceeds a predetermined time period, the information location information associated with the first user and the information acquisition destination, from the storage device.

10. The method according to claim 1, further comprising registering the information location information in a crawling destination list for an RSS reader associated with the first user.

11. An information location management device that manages locations of predetermined information existing on a network, the information location management device comprising:
   a storage device; and
   a processor to perform a process comprising:
   reading a communication log of emails transmitted and received by a plurality of users within a predetermined time period;
   identifying an other-end party with whom a first user has performed transmission and reception of at least one first reciprocated pair of emails not less than a predetermined number of times;
   selecting the identified other-end party as an information acquisition destination when it is determined that the identified other-end party has performed transmission and reception of at least one second reciprocated pair of emails with a second user who belongs to a same group as the first user;
   extracting, in response to the selecting, key information related to a location of information at the information acquisition destination; and
   generating, based on the extracted key information, information location information indicating the location of the information at the information acquisition destination, and storing the information location information in the storage device, wherein the generating of the information location information includes acquiring an email address of the other-end party as the key information.

12. A non-transitory computer-readable medium storing a program for managing locations of predetermined information existing on a network, wherein the program causes a computer to perform a process comprising:
   reading a communication log of emails transmitted and received by a plurality of users within a predetermined time period;
   identifying an other-end party with whom a first user has performed transmission and reception of at least one first reciprocated pair of emails not less than a predetermined number of times;
   selecting the identified other-end party as an information acquisition destination when it is determined that the identified other-end party has performed transmission and reception of at least one second reciprocated pair of emails with a second user who belongs to a same group as the first user;
   extracting, in response to the selecting, key information related to a location of information at the information acquisition destination; and
   generating, based on the extracted key information, information location information indicating the location of the information at the information acquisition destination, and storing the information location information in the storage device, wherein the generating of the information location information includes acquiring an email address of the other-end party as the key information.

* * * * *